US008787702B1

(12) United States Patent
Withers

(10) Patent No.: US 8,787,702 B1
(45) Date of Patent: Jul. 22, 2014

(54) METHODS AND APPARATUS FOR DETERMINING AND/OR MODIFYING IMAGE ORIENTATION

(71) Applicant: William Douglas Withers, Arnold, MD (US)

(72) Inventor: William Douglas Withers, Arnold, MD (US)

(73) Assignee: Accusoft Corporation, Tampa, FL (US)

( * ) Notice: Subject to any disclaimer, the term of this patent is extended or adjusted under 35 U.S.C. 154(b) by 31 days.

(21) Appl. No.: 13/708,254

(22) Filed: Dec. 7, 2012

Related U.S. Application Data

(60) Provisional application No. 61/732,283, filed on Nov. 30, 2012.

(51) Int. Cl.
*G06K 9/32* (2006.01)

(52) U.S. Cl.
USPC ........... 382/296; 382/276; 382/135; 382/138; 382/292; 382/168

(58) Field of Classification Search
USPC ......... 382/135, 138, 168, 276, 292, 295, 296, 382/301
See application file for complete search history.

(56) References Cited

U.S. PATENT DOCUMENTS

| 5,488,491 | A | * | 1/1996 | Steinkirchner | 358/501 |
| 5,621,815 | A | * | 4/1997 | Talukdar et al. | 382/159 |
| 6,574,375 | B1 | * | 6/2003 | Cullen et al. | 382/290 |
| 8,036,417 | B2 | * | 10/2011 | Gallagher et al. | 382/100 |
| 8,275,168 | B2 | * | 9/2012 | Gao et al. | 382/100 |
| 8,345,977 | B2 | * | 1/2013 | Sun et al. | 382/176 |
| 2011/0222768 | A1 | * | 9/2011 | Galic et al. | 382/170 |

* cited by examiner

*Primary Examiner* — Ali Bayat
(74) *Attorney, Agent, or Firm* — Straub & Pokotylo; Michael P. Straub; Stephen T. Straub

(57) ABSTRACT

Methods and apparatus for processing one or more images, e.g., images representing pages including text, to detect and in some instances correct the orientation of the page. In some embodiments the methods and apparatus for processing image data comprise generating a histogram of foreground pixel counts corresponding to a current line of text of the image being processed with the foreground pixel counts corresponding to different rows of pixels corresponding to the current line of text and identifying based on statistical analysis of the generated histogram whether the current page of text is oriented in an inverted or non-inverted position. In some embodiments analysis is performed on multiple lines of text with cumulative statistics being used in to determine the orientation of the page. In some embodiments, a page whose orientation is determined to be upside down is re-oriented to be right-side up.

20 Claims, 20 Drawing Sheets

2200 

Friends, Romans, countrymen, lend me your ears;
I come to bury Caesar, not to praise him. The evil
that men do lives after them; The good is oft
interred with their bones; So let it be with Caesar.
The noble Brutus Hath told you Caesar was
ambitious: If it were so, it was a grievous fault,
And grievously hath Caesar answer'd it. Here,
under leave of Brutus and the rest - For Brutus is
an honourable man; So are they all, all
honourable men - Come I to speak in Caesar's
funeral. He was my friend, faithful and just to me:
But Brutus says he was ambitious; And Brutus is
an honourable man. He hath brought many
captives home to Rome Whose ransoms did the
general coffers fill: Did this in Caesar seem
ambitious? When that the poor have cried, Caesar
hath wept: Ambition should be made of sterner
stuff: Yet Brutus says he was ambitious; And
Brutus is an honourable man. You all did see that
on the Lupercal I thrice presented him a kingly
crown, Which he did thrice refuse: was this
ambition? Yet Brutus says he was ambitious; And,
sure, he is an honourable man. I speak not to
disprove what Brutus spoke, But here I am to
speak what I do know. You all did love him once,
not without cause: What cause withholds you
then, to mourn for him? O judgment! thou art fled
to brutish beasts, And men have lost their reason.
Bear with me; My heart is in the coffin there with
Caesar, And I must pause till it come back to me.

FIGURE 15

METHODS AND APPARATUS FOR DETERMINING AND/OR MODIFYING IMAGE ORIENTATION

FIELD

The present application relates to image processing methods and apparatus and, more particularly, to methods and apparatus for identifying and/or correcting the orientation of images including text, e.g., scanned images.

BACKGROUND

For purposes of electronic storage, form processing, and/or for electronic document transmission, paper documents are often optically scanned and then processed. Scanning of documents often results in a set of binary, e.g., black or white, pixel values, representing the scanned image. In most cases where printed documents are scanned, the text will be black or interpreted as black with the background being white. In such cases, black pixel values are interpreted as corresponding to the foreground and white pixel values corresponding to the background. For example, a black pixel value may be represented by a "1" pixel value and a white pixel value represented by a "0" pixel value.

As part of the scanning process one or more sheets of paper may be scanned. Unfortunately, as part of the scanning processes and/or as the result of previous copying errors one or more sheets of paper may be and often are scanned upside down. Scanned images which are upside down are sometimes referred to as being inverted. The presence of one or more inverted pages in a scanned document make the inverted images, e.g., pages of inverted text difficult to read and can interfere with some image processing techniques commonly applied to scanned documents such as, for example, optical character recognition used to recognize text words in a scanned document. In many instances such as the aforementioned, it is desirable to analyze the digital image of a scanned document and determine if one or more pages should be inverted to place the image, e.g., page, in a right-side-up orientation. To do this requires the ability to determine whether a text image is upside down or right side up.

While a stack of papers, e.g., pages, forming a multipage document including text may be scanned in a single scanning operation, the stack of pages may include sheets that have different orientations. This may occur if, for example, one or more pages of the document were put in the scanner upside down. Thus, it should be appreciated that it is desirable to be able to identify the orientation of each page of an image and be able to re-orient the pages such that all pages of the document are oriented in the same manner, for example in right side up manner such that a user viewing the document can read each page of the document without having to re-orient individual pages of the document.

The detection, e.g., identification, of the orientation of an image or a portion of an image including lines of text in a generally reliable manner is particularly important if subsequent image processing, e.g., optical character recognition, is to occur which takes into consideration the orientation of the text on the image such as in optical character recognition. It should be appreciated that since the re-orientation process will normally precede optical character recognition in many applications, it is desirable that the orientation determination process need not rely on the recognition of individual characters or words and be able to proceed prior to reliable recognition of the actual text words or phrases in the document being scanned. It should also be noted that it is desirable that the orientation determination process be capable of being performed independently from page to page since the orientation of one page in a scanned document does not guarantee that the next scanned page will have the same orientation.

In view of the above discussion, it should be appreciated that there is a need for methods and apparatus for identifying the orientation of a scanned image including lines of text and/or for performing image processing operations on an image or portions of an image based on information regarding the orientation of the scanned image.

SUMMARY

Methods and apparatus for processing one or more images, e.g., corresponding to a page including text, to detect the orientation of the page are described. The orientation process may be followed by a subsequent image processing operation such as inverting pages to be found upside down and/or other operations such as optical character recognition operations.

Thus, depending on the determined orientation of a page, an action may be taken, e.g., to reorient the page in the event that it is determined to be inverted. The re-oriented page can and in some embodiments is, stored in a file with other properly oriented pages. The re-oriented page may replace an inverted page in a file or be output as part of a new file including copies of original pages which were not inverted and thus did not need to be re-oriented along with re-oriented pages which were generated by inverting pages which were determined to be miss-oriented, e.g., inverted. The file generated by the image processing may, and in some embodiments is, stored in non-transitory memory and/or transmitted, e.g., over a communications link, to another device for further processing and/or display.

The methods and apparatus of the present invention are well suited for processing scanned documents including text and can be used to determine the orientation of the scanned page prior to completing optical character recognition operations used to identify individual characters and/or words.

The methods and apparatus of the present invention take advantage of the fact that a line of text including non-capital letters will exhibit a particular pattern if the pixels of the line are examined on a per row basis. As will be discussed below, it has been determined that a conventional line of text, e.g., text including at least some non-capital letters which is commonly the case in printed documents, will exhibit two peaks if the foreground pixels are summed on a per row basis to form a histogram of foreground pixel value counts. The two peaks in the histogram will be separated by a middle, e.g., body or trunk portion, which is more massive, e.g., has a higher foreground pixel count, than either of the two other portions of the histogram which occur above and below the middle portion. For purposes of discussion, above refers to a position of a row of pixel values higher up in a column of pixel values that is being processed. While a portion above the middle or body portion of a line of text in a page is being processed, it should be appreciated that the portion above the middle will actually correspond to a bottom portion of a line of text if the page being processed has been inverted.

The methods of the present invention take advantage of the fact that a line of text will normally have a higher foreground pixel count in the upper portion, e.g., upper tail or head, of the line of text than the lower portion, e.g., lower tail or leg, if the line of text is not inverted but both the upper and lower tails will have a lower pixel count than the body portion which occurs between the two peaks in the histogram of pixel values. By generating a histogram of pixel values for a line of text, identifying the peaks in the histogram and then comparing the foreground pixel counts corresponding to the different portions of the line of text as determined based on the identified histogram peaks, a determination of whether or not a line of text is inverted or properly oriented in a right side up position can, and in some embodiments is, made.

The methods and apparatus of the present invention are robust enough that precise identification of the peaks in a histogram of pixel values corresponding to a line of text is not required and even if the location of the peaks in the line of text is miss-identified by one or a few rows of pixel values the determination as to the orientation of the text row remains reasonably reliable.

A decision as to whether or not a page being processed is inverted, e.g., upside down, is made based on the determination of whether a line of text on the page is inverted or right side up.

To increase the reliability of the method, in some embodiments, multiple lines of text on a page are examined and the decision of whether the page is inverted or not is made based on cumulative statistics derived from multiple lines of text. In at least one embodiment count of the number of foreground pixels in the "head" portion of lines of text minus the number of foreground pixels in the "leg" portion of the same lines is maintained for a page and the decision of whether the page is inverted or right side up is made based on whether this cumulative difference is positive or negative, since typically the "head" portion of lines contain more foreground pixels than the "tail" portion if the page is correctly oriented, and vice-versa. This count may be weighted according to the estimated number of characters in each line and/or the calculated statistical imbalance used to determine the orientation of each line (described below). If the cumulative difference value is negative, the page will be determined to be inverted in some embodiments and the page may, and in some embodiments is, then subject to an inversion operation to turn it right side up.

While a page can, and in some embodiments is, treated as a single column of text, in some implementations prior to determining if a line of text is right side up or inverted, a page may be split or otherwise divided into multiple columns. The lines of text in each column may, and in some embodiments are, processed to determine cumulative statistics from which a determination can be made as to whether the page is right side up or inverted. While a single column page may be treated as two columns without adverse consequences other than a minor increase in processing in terms of increasing the number of text rows to be processed, the splitting of a page into multiple columns decreases the chance that a page with multiple columns of potentially non-aligned text rows may reduce the reliability of the detection method. The treating of a page of text as multiple columns is not necessary or needed in all embodiments, e.g., embodiments where images corresponding to single column pages will be processed.

To increase system reliability different size lines of text may be identified and processed separately. In some embodiments a large line spacing is initially presumed with testing being made for smaller line spacing in regions of a page were one or more lines of large size text are not identified.

While text lines may be identified using a variety of techniques prior to determining the orientation of the line of text, in some embodiments lines of text are identified by comparing a histogram of foreground pixel values corresponding to a set of rows of pixel values to the expected histogram for a line of text. In at least some such embodiments if the histogram for the set of rows of pixel values matches the expected histogram including two peaks and a body portion with less massive portions above and below the body portion, the set of rows of pixel values is considered to be a line of text subject to further analysis.

The histogram of foreground pixel counts used in the methods and apparatus of the present invention is easily computed allowing for a potentially fast and relatively simple, from a computation perspective, method of determining the orientation of lines of text and a page including one or more lines of text.

By processing a set of pages, e.g., scanned images corresponding to a document, and generating a new file including pages which are properly oriented via a machine implemented process, subsequent review of the document's contents and/or image processing of the document is facilitated since the pages will appear in the right side up orientation in the output file that is generated.

While various exemplary embodiments and features have been described, numerous additional features and embodiments are described in the detailed description which follows.

BRIEF DESCRIPTION OF THE FIGURES

FIG. 15 illustrates an exemplary inverted page of text.

DETAILED DESCRIPTION

Figure 10:
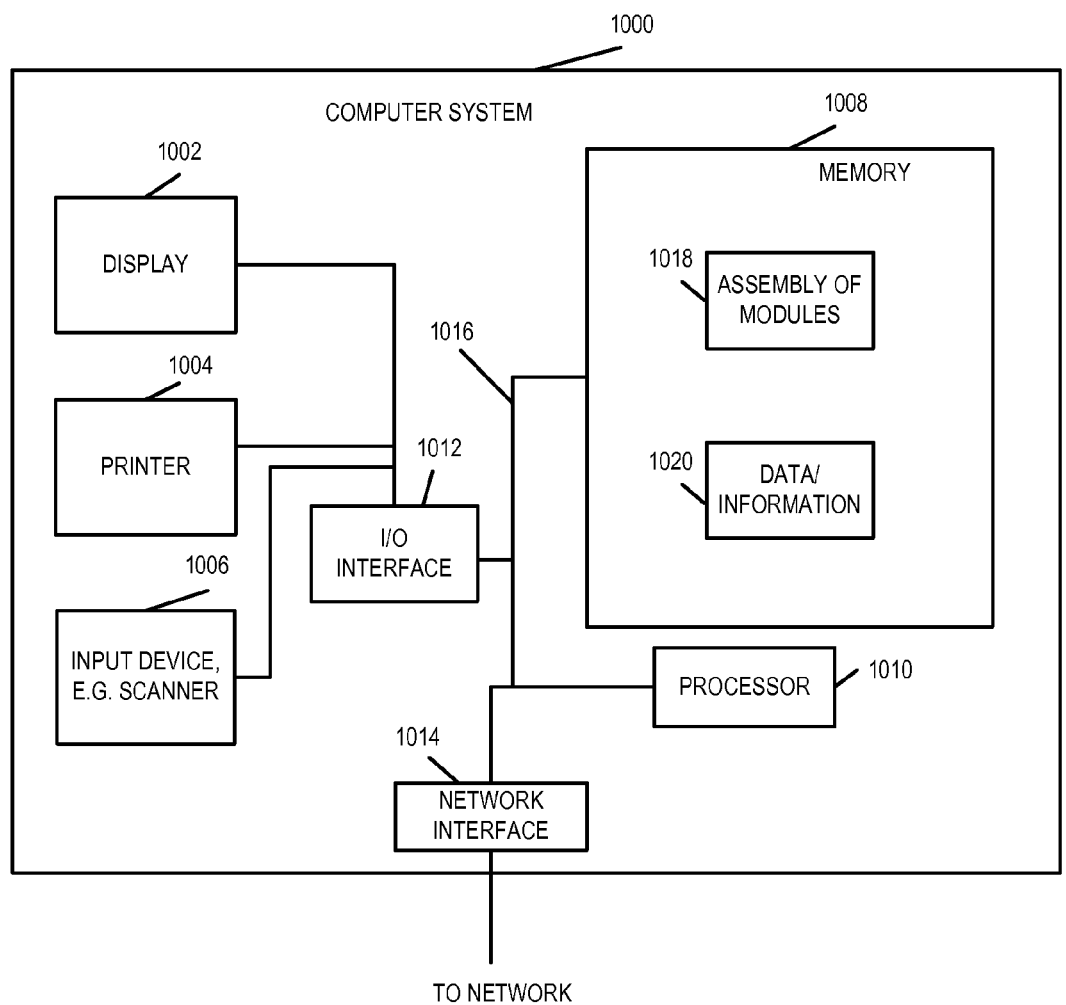
FIG. 10 illustrates an exemplary system in accordance with one embodiment of the present invention.

FIG. 10 illustrates an exemplary system, e.g., computer system 1000, for processing image data, e.g., a scanned and digitized page of a document in accordance with one embodiment of the invention. The image data being processed may be, and in various embodiments does, represent all or a portion of an image that includes one or more lines of textual data the orientation of which is to be identified as part of the image processing performed in accordance with the present invention. The textual lines may be, e.g., the result of a page of a form which was scanned to generate the image data. The lines of textual data may, and in some embodiments do, include printed text containing large and small characters forming words in the English language.

The exemplary computer system 1000 includes a display device 1002, an output device, e.g., printer 1004, an input device 1006, e.g., scanner for scanning paper versions of documents, memory 1008, a processor 1010, a network interface 1014, and an I/O interface 1012. The display device 1002 may be, and in some embodiments is, used to display images resulting from the image processing performed in accordance with the present invention while the printer may be used to print such images. Thus, the processed images, for example the images of multipage documents containing printed lines of text, are outputted in some embodiments in non-inverted or top-down orientation in a viewable or physical form thereby allowing a user of the system to more easily view and read the content of the image than might be the case if it included pages in an inverted or bottom-up orientation as present in the original scanned images.

The display device 1002, printer 1004, and input device 1006 are coupled to a bus 1016 by an I/O interface 1012. The bus 1016 is also coupled to the memory 1008, processor 1010 and network interface 1014. The network interface 1014 couples the internal components of the system 1000 to an external network, e.g., the Internet thereby allowing the system 1000 to receive images, e.g., with lines of text, and send image data, e.g., digitized pages or portions of pages with lines of text correctly oriented in accordance with the present invention, over a network.

The processor 1010 controls operation of the computer system 1000 under direction of software modules and/or routines stored in the memory 1008. Memory 1008 includes an assembly of modules 1018 wherein one or more modules include one or more software routines, e.g., machine executable instructions, for implementing the image processing methods of the present invention. Individual steps and/or lines of code in the modules of 1018 when executed by the processor 1010 control the processor 1010 to perform steps of the method of the invention. When executed by processor 1010, the image processing modules 1018 cause at least some image data to be processed by the processor 1010 in accordance with the method of the present invention. The resulting data and information (e.g., image data, orientation data and/or statistics) are stored in data memory 1020 for future use or additional processing or output, e.g., to display device 1002 to be displayed or to printer 1004 for printing.

Figure 13:
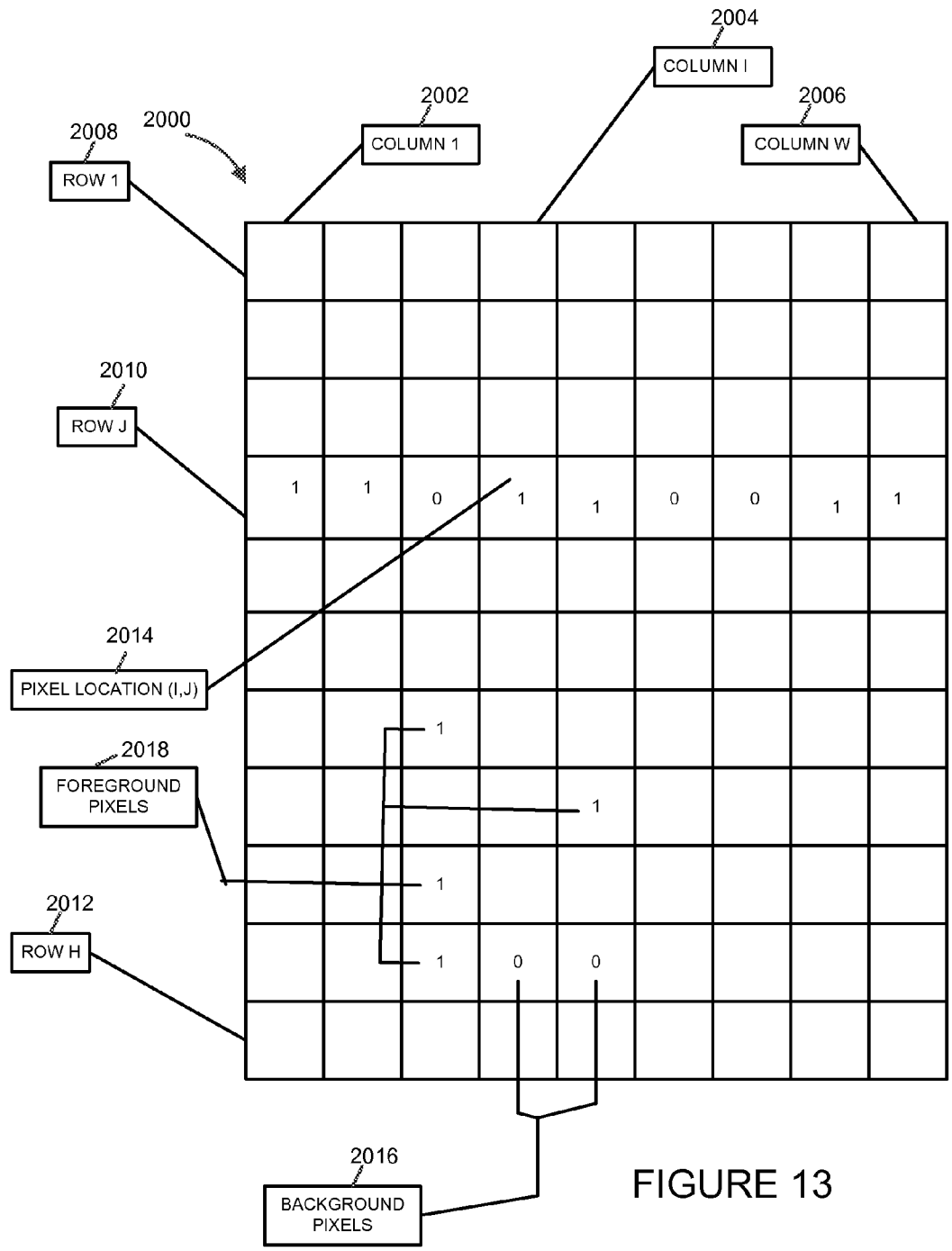
FIG. 13 illustrates the layout of a rectangular pixel array.

The image processing method can be understood in the context of the processing of an image corresponding to an exemplary page including lines of printed English text in small and capital letters. Consider for example the image of an exemplary page 2100 shown in FIG. 14. Page 2100 is a page including lines of text having a top-down or non-inverting orientation. Line of text 2102 and line of text 2104 are the first two lines of text on the page. Line of text 2106 is the last line of text on the page. Page 2200 of FIG. 15 is an example of a page including lines of text having a bottom-up or inverted orientation. The lines of text on the page appear upside down. When a page is scanned, the result of the scanning process is a set of information representing the digitized image of the page. The set of information normally, but not always, corresponds to a rectangular array of pixel elements or pixels with the array being of dimensions W and H where the "width", W, is the number of pixels in each horizontal row of the array and the "height", H, is the number of pixels in each vertical column of the pixel array. The columns may be identified, for purposes of discussing such as a set of information, by an index, I, whose values can range from 1 to W; and the rows can be identified by an index J whose values range from 1 to H, where W, H, J and I are integer values. If a pixel array itself is labeled as PA, then the value of a pixel in the column with index I and row with index J is labeled for discussion purposes as PA(I, J). The ordered pair (I, J) is sometimes called the "address" or "pixel location" of this pixel. This is illustrated in FIG. 13. FIG. 13 includes an exemplary pixel array 2000 in which column 1 2002, exemplary column 1 2004, column W 2006, row 1 2008, exemplary row J 2010, row H 2012, and exemplary pixel location (I, J) 2014 are identified. A histogram of the number of foreground pixels in each row of an image can be expressed as an array HIST[row index integer]=sum of foreground pixels in the row specified by the index integer for each row of the image. For example in FIG. 13, HIST[J]=6 specifies that row J of the histogram of the image 2000 of FIG. 13 has six foreground pixels. The values of the histogram for each row of the image would be calculated in the same manner.

While the particular colors that are used on a page, e.g., a form, can vary from application to application, many applications only have two distinguishing color features, the background color and the foreground color. It is common practice to set the values of all pixels representing the background color to the number 0, as illustrated with background pixels 2016 in FIG. 13, and all pixels representing the foreground color to the value 1, as illustrated with foreground pixels 2018 in FIG. 13. However, the use of 0 to represent background and 1 to represent foreground may vary from one application to another and thus the use of 0 for background and 1 for foreground is exemplary.

Figure 14:
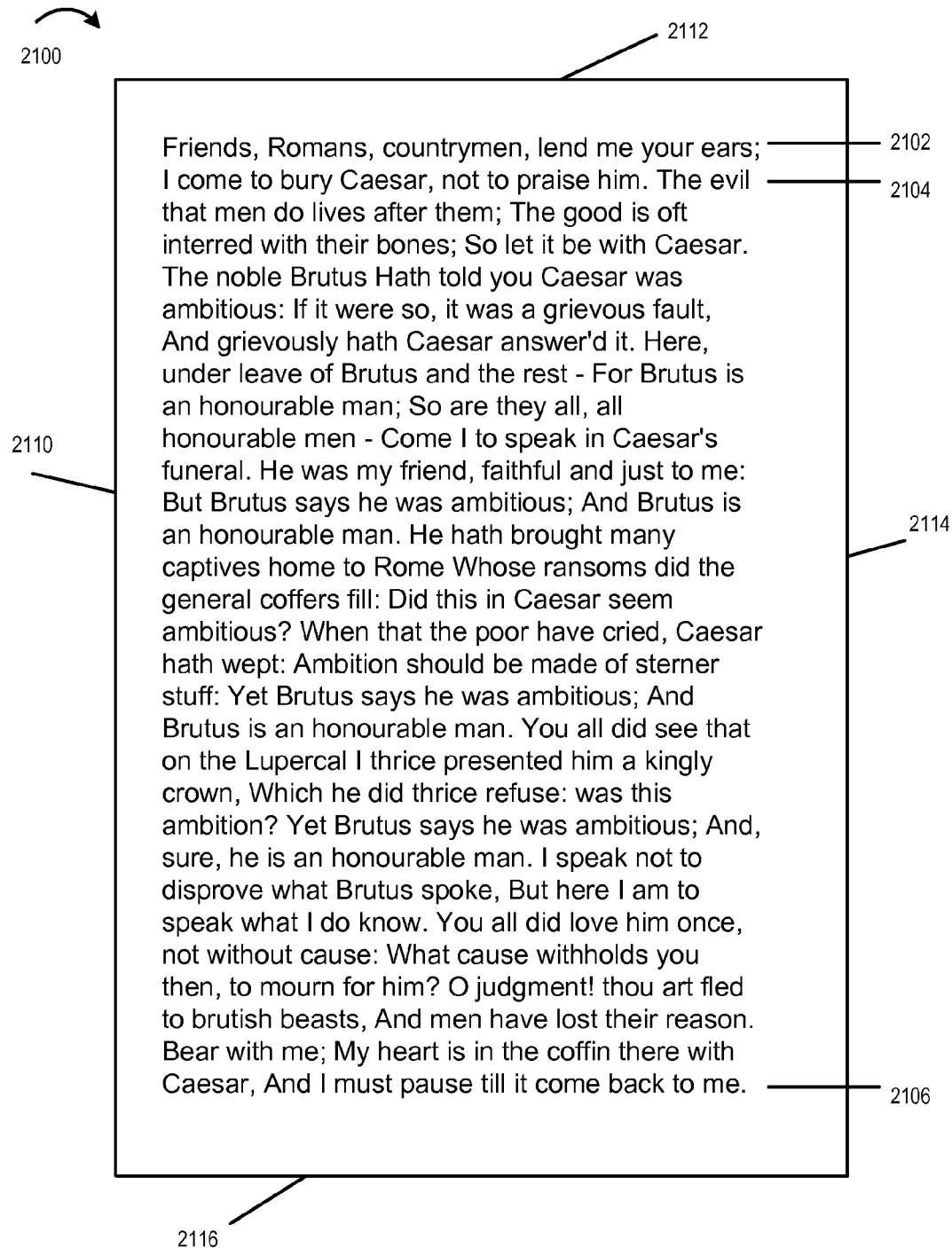
FIG. 14 illustrates an exemplary non-inverted page of text.

FIG. 14 shows an ideal undistorted image 2100 of an exemplary page with printed textual data correctly oriented which has been scanned and digitized. The image forms a rectangle with four edges, a left edge 2110, a top edge 2112, a right edge 2114 and a bottom edge 2116. Unfortunately, in real world applications the image shown in FIG. 14 is not always correctly oriented do to a variety of reasons, including for example paper orientation errors during scanning FIG. 15 depicts an image 2200 of the scanned page having an upside down orientation also referred to as bottom down orientation or inverted orientation. As shown in image 2200 the lines of text are upside down from the text on page 2100 of FIG. 14.

Prior to the method of the present invention for determining the orientation of the scanned document image is applied, the following image processing is typically performed. The image is deskewed. Processing is performed to determine if the image is sideways. If the image is determined to be sideways it is rotated 90 degrees so that the image's orientation will be right side up or upside down. It is then determined whether the image is reversed white-to-black so that the foreground and background pixels can be properly identified. Reversed white-to-black images have the background black and foreground white. The pixels relating to the margins of the page are identified and excluded from the image data to be processed in at least some embodiments.

Figure 9A:
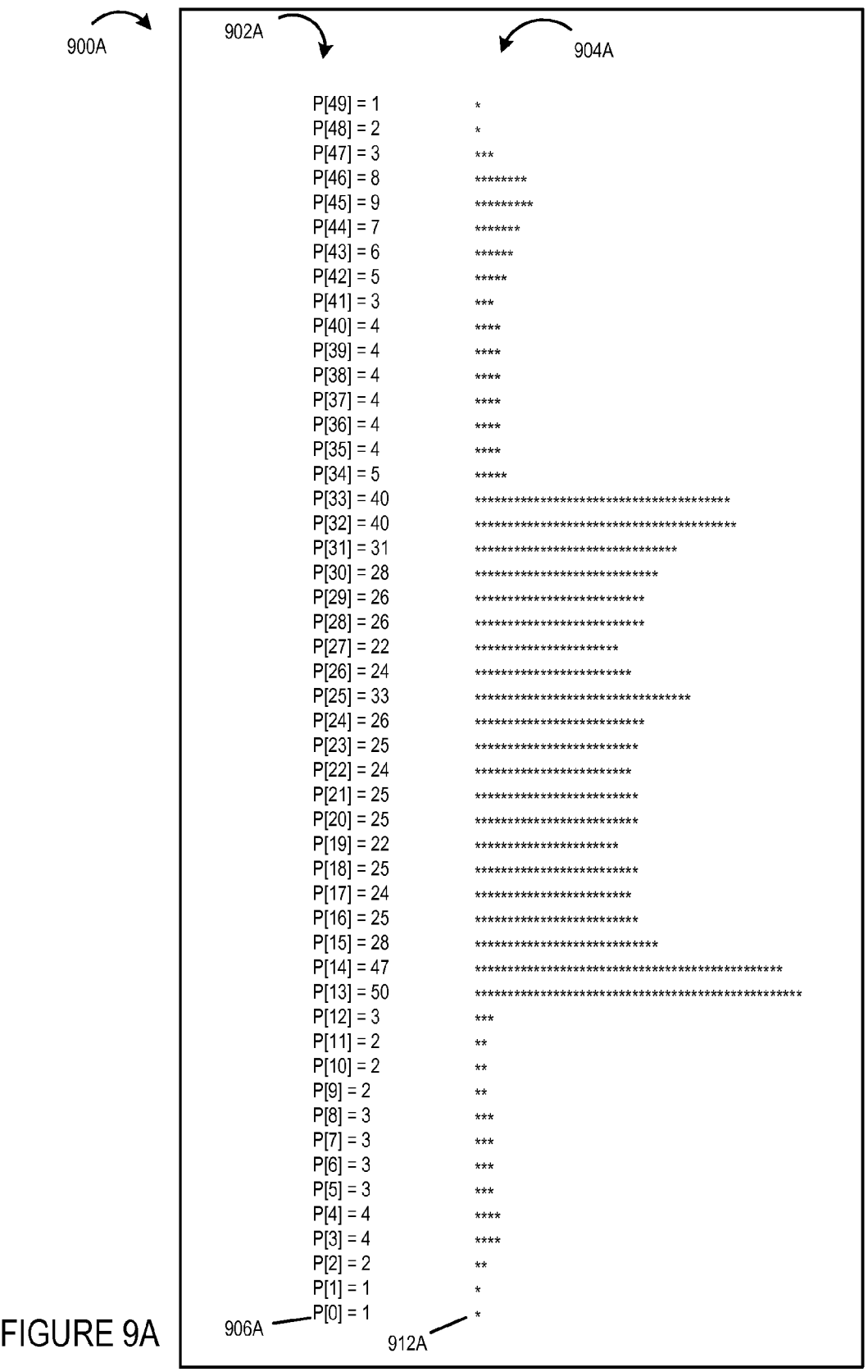
FIG. 9A illustrates an exemplary characteristic histogram profile for a line of English text in numerical and graphical form.

The image to be processed is now either right-side up or needs to be rotated 180 degrees. The method of the present invention for determining the orientation of the page utilizes horizontal projections of the image. The method of the present invention utilizes the fact that a correctly oriented, i.e., right side-up, typical line of text, e.g., English text, projected horizontally, presents a distinctive profile. Diagram 900A of FIG. 9A shows an exemplary characteristic profile of a line of English text 904A and the same profile as a histogram profile P represented in numerical form 902A. The image of the line of text contains 50 rows of pixels. The first row is 912A and contains one foreground pixel as denoted by profile histogram P[0]=1 906A. The histogram profile 902A shows the number of foreground pixels in each row of the image forming the line of text. The histogram profile 904A provides the same information showing the line of text histogram profile graphically with each row containing the same number of *s as foreground pixels in the row.

The characteristic profile as exemplified in diagram 900A of FIG. 9A has a large middle bulge that represents the normal vertical span of small characters such as for example, the letters 'e', 'o', and 's'. This bulge is typically defined by the peaks at each end. The distribution has both an upper and a lower tail. In a correctly oriented page, the upper tail above the bulge reflects letters with ascenders, such as, for example, the letters 'b', 'd', 'k', as well as capital letters; and the lower tail below the bulge reflects letters with descenders, such as for example, the letters 'p', 'q', and 'g'. The middle bulge is also referred to herein as the trunk. In the page as encountered (which may or may not be correctly oriented) the upper tail is also referred to herein as the head, and, the lower tail is also referred to herein as the leg.

The method of the present invention determines the orientation of the page based on the statistical properties of the image of the lines of text. When the text of a line is right-side up or non-inverted statistically the upper tail tends to be significantly more massive than the lower tail. That is there are more foreground pixels in the upper tail than in the lower tail. If the lower tail is more massive than the upper tail, this is an indication that the page is upside down. A typical page contains many lines of text, providing a firm statistical basis for the decision.

Having generated a horizontal projection of the image, the method of the present invention searches the horizontal projection for instances of the characteristic profile mentioned above an example of which is depicted in FIG. 9A diagram 904A. Since the size and spacing of the lines is not known ahead of time, the method searches iteratively at successively decreasing scales. Since the profile is a one-dimensional object, even this repeated searching is an extremely fast operation. Once found, sections of the horizontal profile identified as a characteristic profile are omitted from future searching, as different instances of the characteristic profile cannot overlap. A series of criteria are used to isolate a characteristic profile and avoid mischaracterizing, for example, two adjacent lines of text as a single line, or a horizontal ruled line as a line of text.

A nontrivial decision is the amount of weighting to be given to various lines of text found. It is not clear, for example, that a single large-scale line, consisting of relatively few large characters, should be given greater weight than a small-scale line consisting of many small-scale characters, even if the large-scale line contains more pixels. In some embodiments of the present method, the method estimates the number of characters in each line found based on the diameter and total mass of the characteristic profile.

To overcome other potential problems such as confusion caused, for example, in some instances when the page consists of several columns of text which are not horizontally aligned, some embodiments of the present invention divide the image of the page into broad vertical strips which "vote" on the correct answer. This voting method means it is not necessary to determine the boundaries of text columns.

Figure 9B:
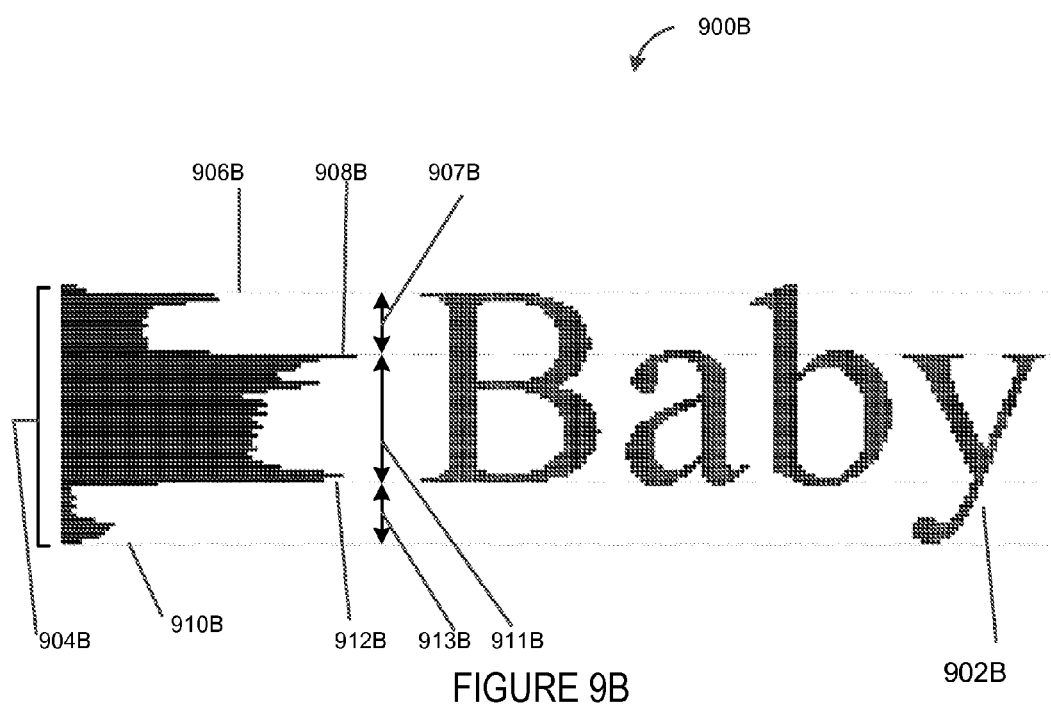
FIG. 9B illustrates a line of text in a non-inverted orientation and an associated histogram profile for the non-inverted line of text.
Figure 9C:
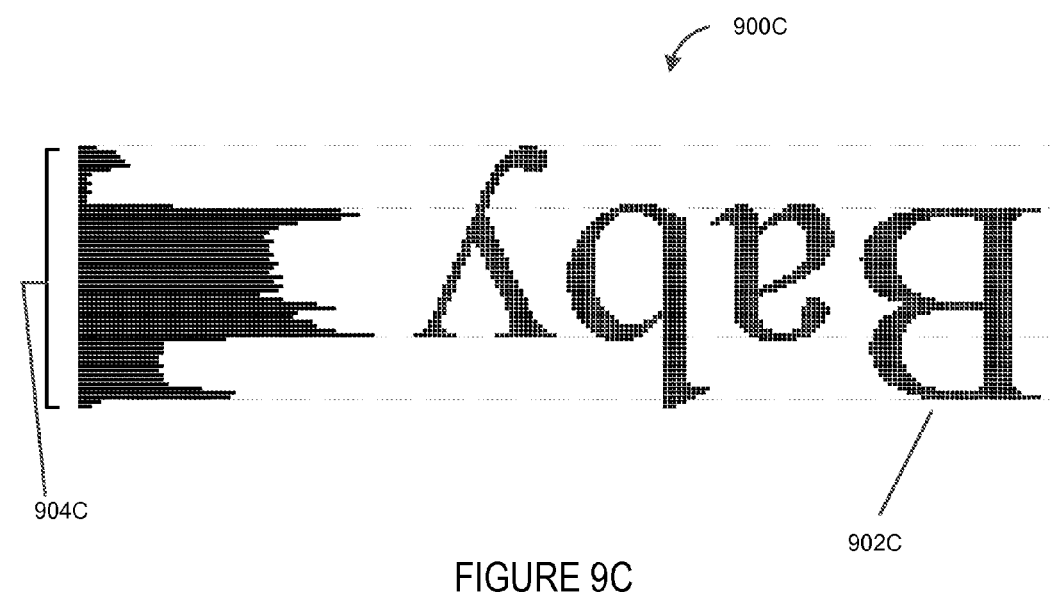
FIG. 9C illustrates a line of text in an inverted orientation and an associated histogram profile for the inverted line of text.

Diagrams 900B and 900C of FIGS. 9B and 9C respectively show the characteristic profiles for a line of text containing the word "Baby." FIG. 9B shows the profile for the line of text in a non-inverted orientation and FIG. 9C shows the profile for the line of text in an inverted orientation.

An exemplary method of performing the process which may be and in some embodiments of the present invention is used for analyzing a digital image including printed text and identifying whether the image is oriented top-down or bottom-up will now be discussed in connection with reference to routine 100 of FIG. 1. The image data is organized sequentially in rows, each row consisting of a combination of black and white pixel values. Top-down refers to and is used interchangeable with the term non-inverted herein. FIG. 9B shows a top-down or non-inverted image of the printed text word "Baby". Top-down or non-inverting orientation implies that each successive row of the image is taken to lie below the preceding row. Bottom-up refers to and is used interchangeable with the term inverted herein. FIG. 9C shows a bottom-up or inverted image of the printed text word "Baby". Bottom-up or inverting orientation implies that each successive row of the image is taken to lie above the preceding row.

The method of exemplary routine 100 starts at start step 102 with the routine 100 being executed by the processor 1010. At this point, the image data to be analyzed for orientation identification and correction has already been digitized through scanning or other methods. While binary image data is processed in the exemplary embodiment, the methods and apparatus of the invention can be used with other types of image data as well, e.g., with gray scale and/or color images. In the case of binary image data, individual pixels are normally represented using one of two values corresponding to either a pixel being black or being white. Given the binary nature of such image data, it is well suited for forms and/or text documents and thus will be used for explaining at least some exemplary embodiments of the invention. The image data may include one pixel value for each pixel of the represented image with the value indicating either a black or white pixel.

Various methods and/or subroutines which may be used to implement one or more of the steps of the main routine 100 will be discussed with regard to various figures after the main routine 100 is described.

From start step 102, execution proceeds to step 104. In step 104, a profile histogram, denoted P, is generated so that P[Y] denotes the number of black pixels in the Yth row of the image data, e.g., binary image data corresponding to the image or image section such as a vertical strip of the page to be analyzed. Individual pixel values are not used beyond the generation of this histogram. The histogram P[Y] is stored in memory module 1020 of memory 1008 and may later be used in other processing steps of the method, e.g., as part of identifying a row of text. From step 104, processing proceeds to step 106. In processing step 106, all Y-values corresponding to rows of the image are marked as "unused", meaning that they have not yet been identified as belonging to a row of text. From step 106 processing proceeds to step 108. In step 108, the variable TOTALSURPLUS is initialized in memory module 1020 of memory 1008 to have the value zero; this value will be modified as the method progresses. From step 108 processing proceeds to step 110 wherein the variable TOTALESTCHARCT is initialized to have the value zero; this value will be modified as the method progresses. The variable TOTALESTCHARCT will be used in the method to track the total estimated character count in the image or section of image being processed. From step 110 processing proceeds to step 112, wherein the variable SCALE is set to an initial value C2, which may vary but in the exemplary embodiment is initialized to be the value 233. The variable SCALE is used to adjust the number of rows to be analyzed during processing to identify a row of text in the image.

From step 112 processing proceeds to step 114. In step 114 the values in the histogram P are processed using the given value of SCALE, according to steps detailed in exemplary subroutine 200 of FIG. 2 discussed in further detail below. Once the values of histogram P have been analyzed in step 114, processing proceeds to step 116, wherein the value of SCALE is reduced by multiplying SCALE by a predetermined fraction C3, whose value may vary but in some embodiments including the exemplary embodiment is taken to be 7/8. Processing proceeds from step 116 to decision step 118. In decision step 118, the new value of SCALE is compared to a predetermined threshold C4, whose value may vary but in some embodiments including the exemplary embodiment is set to be 8. If the value of SCALE exceeds the threshold, processing continues with the new value of SCALE back at step 114. Otherwise, processing proceeds to step 120. In processing step 120, the statistics accumulated during the preceding processing steps are analyzed to determine the orientation of the image. Subroutine 800 shown in FIG. 8 which will be discussed further below may be, and in some embodiments is, used to implement step 120. Upon completion of the analysis of the orientation of the image, the method will end at step 122 pending input of another image to be processed and the repeating of the method 100, e.g., on an image representing a subsequent page of a multi-part document being processed.

Figure 1:
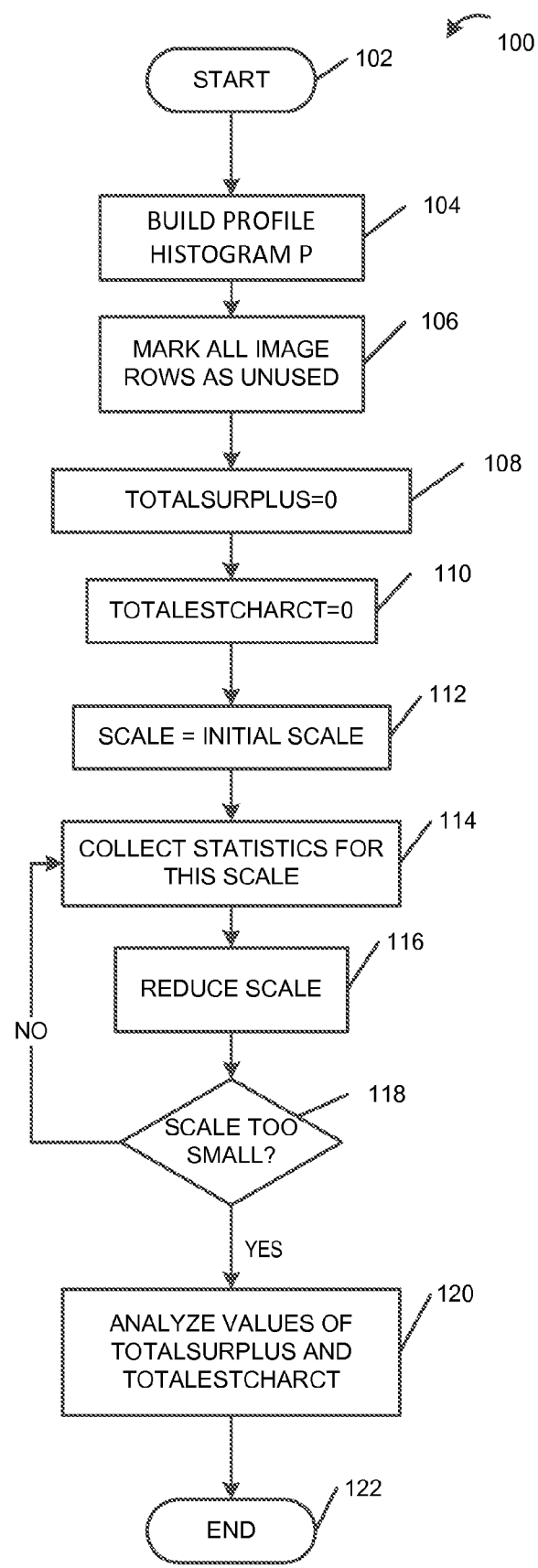
FIG. 1 illustrates an exemplary image processing method for identifying the orientation of an image including text in accordance with one embodiment of the present invention.
Figure 2:
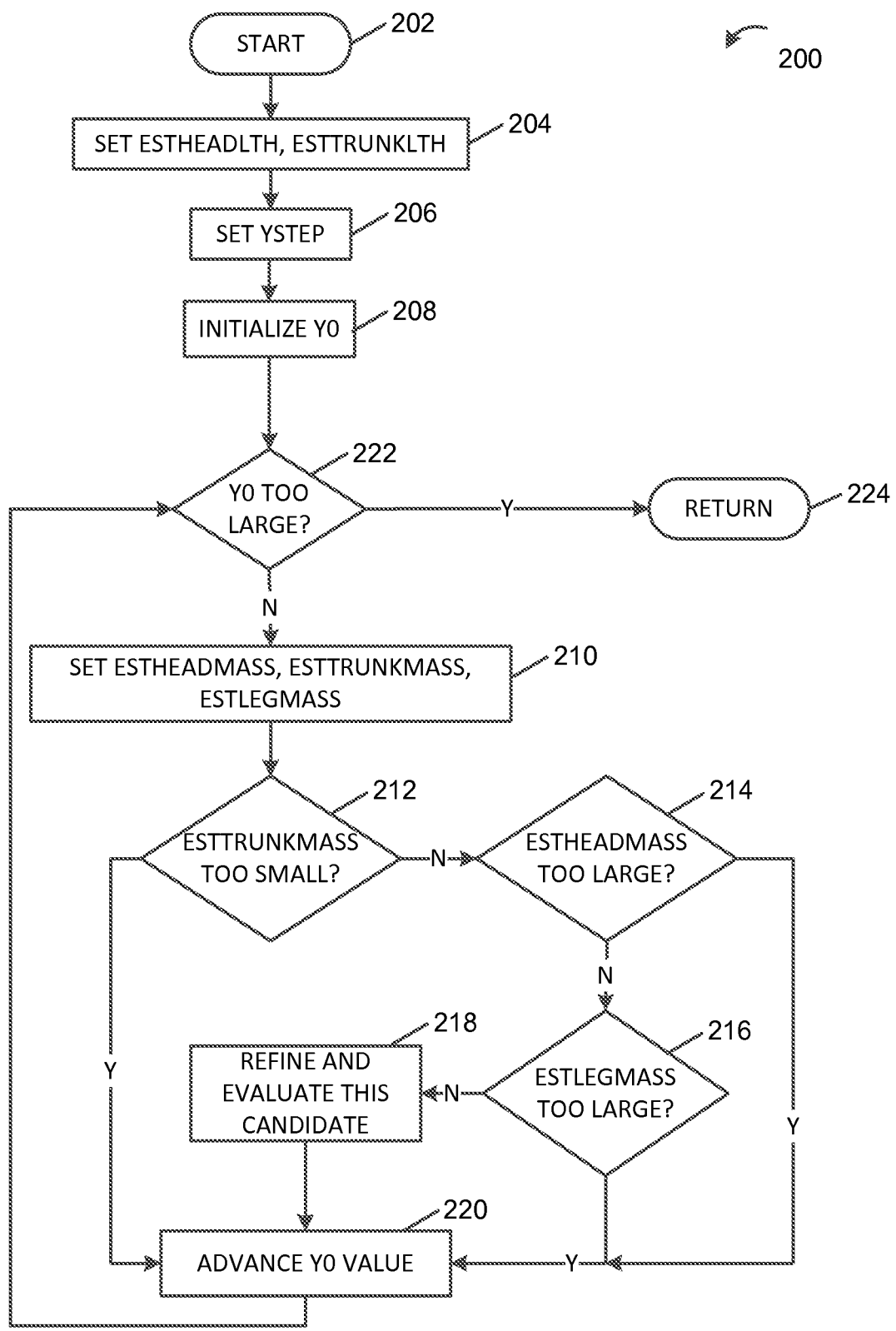
FIG. 2 illustrates an exemplary subroutine which is used to collect statistical data from the image in accordance with one embodiment of the present invention.

FIG. 2 illustrates an exemplary subroutine 200 which may be, and in some embodiments of the present invention is, used for implementing step 114 of routine 100 of FIG. 1 which collects statistics from the profile histogram P for a given value of SCALE. An important part of this process is identifying a segment of the profile presenting the typical trilobed (i.e., three lobed) structure associated with the typical text-line profile as shown in FIGS. 9B and 9C. Diagram 900B of FIG. 9B shows a profile histogram P 904B generated from the text "Baby" 902B. For purpose of exposition, the middle section of this histogram profile 904B is denoted the "trunk" which include the rows between 908B and 912B inclusively shown as dotted lines, while the two tails on each end are denoted the "head" which include the rows between 906B and 908B and include the row 906B but not 908B and the "leg" which are between 912B and 910B, the "head" preceding the "trunk" in the ordering of the image rows and the "leg" following the "trunk" in the ordering of the image rows.

The subroutine 200 starts at start step 202 with subroutine 200 being executed on processor 1010 from which execution proceeds to step 204. In step 204, the variable ESTHEADLTH which is used in estimating the head length of a typical text-line histogram profile is set to a value which may, and in some embodiments including the exemplary embodiment, depends on the current value of SCALE. In some embodiments the value of ESTHEADLTH is set to a given fraction of the value of SCALE. The value of this fraction may vary but in some embodiments including the exemplary embodiment is set to 2/7. In step 204, the value of ESTTRUNKLTH which is used in estimating the trunk length of a typical text-line histogram profile is set to (SCALE-2*ESTHEADLTH). After setting the values of ESTHEADLTH and ESTTRUNKLTH in step 204, processing proceeds to step 206. In step 206, the value of the variable YSTEP is set to a value which may, and in some embodiments including the exemplary embodiment does, depend on the value of SCALE. In some embodiments including the example embodiment, the variable YSTEP is taken to equal a certain fraction of SCALE. The value of this fraction may vary but in some embodiments including the exemplary embodiment is set to be 1/14. From step 206, processing proceeds to step 208. In step 208 the value of the variable Y0 is initialized by being set to the first image row such that none of the rows from Y0 through (Y0+SCALE-1) inclusive have hitherto been marked as "used". Processing then proceeds to decision step 222.

In decision step 222, the value of (Y0+SCALE) is compared against the number of rows in the image. If the index value (Y0+SCALE) is beyond the last row of the image, then processing proceeds to the return step 224 of subroutine 200. Otherwise processing proceeds to step 210. In step 210, the values of the variables ESTHEADMASS, ESTTRUNKMASS, and ESTLEGMASS are set based on the contents of the profile histogram P. The variable ESTHEADMASS is used to hold the value of the estimated head mass. The variable ESTTRUNKMASS is used to hold the value of the estimated trunk mass. And, the variable ESTLEGMASS is used to hold the value of the estimated leg mass. The value of ESTHEADMASS is set to the total mass of entries in profile histogram P for index values from Y0 to (Y0+ESTHEADLTH-1), inclusive. The value of ESTTRUNKMASS is set to the total mass of entries in profile histogram P for index values from (Y0+ESTHEADLTH) to (Y0+ESTHEADLTH+ESTTRUNKLTH-1), inclusive. The value of ESTLEGMASS is set to the total mass of entries in P for index values from (Y0+ESTHEADLTH+ESTTRUNKLTH) to (Y0+2*ESTHEADLTH+ESTTRUNKLTH-1), inclusive. Processing then proceeds to decision step 212.

In decision step 212, the value of ESTTRUNKMASS is compared against a certain fraction of the product of ESTTRUNKLTH and the number of columns in the image. The value of this fraction may vary but in some embodiments including the exemplary embodiment is taken to be 1/10. If the value of ESTTRUNKMASS exceeds this fraction then processing proceeds to step 214. Otherwise processing proceeds to step 220.

In decision step 214, the value of ESTHEADMASS is compared against a certain fraction of the value of ESTTRUNKMASS. The value of this fraction may vary but in some embodiments, including the exemplary embodiment, is set to be 1/3. If the value of ESTHEADMASS exceeds this fraction then processing proceeds to step 220. Otherwise processing proceeds to decision step 216.

In decision step 216, the value of ESTLEGMASS is compared against a certain fraction of the value of ESTTRUNKMASS. The value of this fraction may vary but in some embodiments, including the exemplary embodiment, is set to be 1/3. If the value of ESTLEGMASS exceeds this fraction then processing proceeds to step 220. Otherwise processing proceeds to step 218.

In step 218, the set of image rows between Y0 and (Y0+SCALE) is considered to represent a possible text row. In step 218 the possible text row is evaluated and the positioning refined. Step 218 may be, and in some embodiments including the exemplary embodiment of the present invention is, performed by exemplary subroutine 300 which is described in further detail below.

In step 220 the value of Y0 is advanced to a new position where a text row might be located. The new position is the next succeeding value of Y0 greater than the current value by at least YSTEP and such that none of the rows from Y0 through (Y0+SCALE-1) inclusive have hitherto been marked as "used". Processing then proceeds to decision step 222 wherein as previously described the value of Y0 is tested to determine if it is too large and if it is processing proceeds to return step 224 where this portion of the processing of the method concludes. The values set or calculated in this subroutine may be, and in some embodiments including the exemplary embodiments are, stored in memory data/information module 1020 of memory 1008 for later use such as in processing of other steps of the method.

Figure 3:
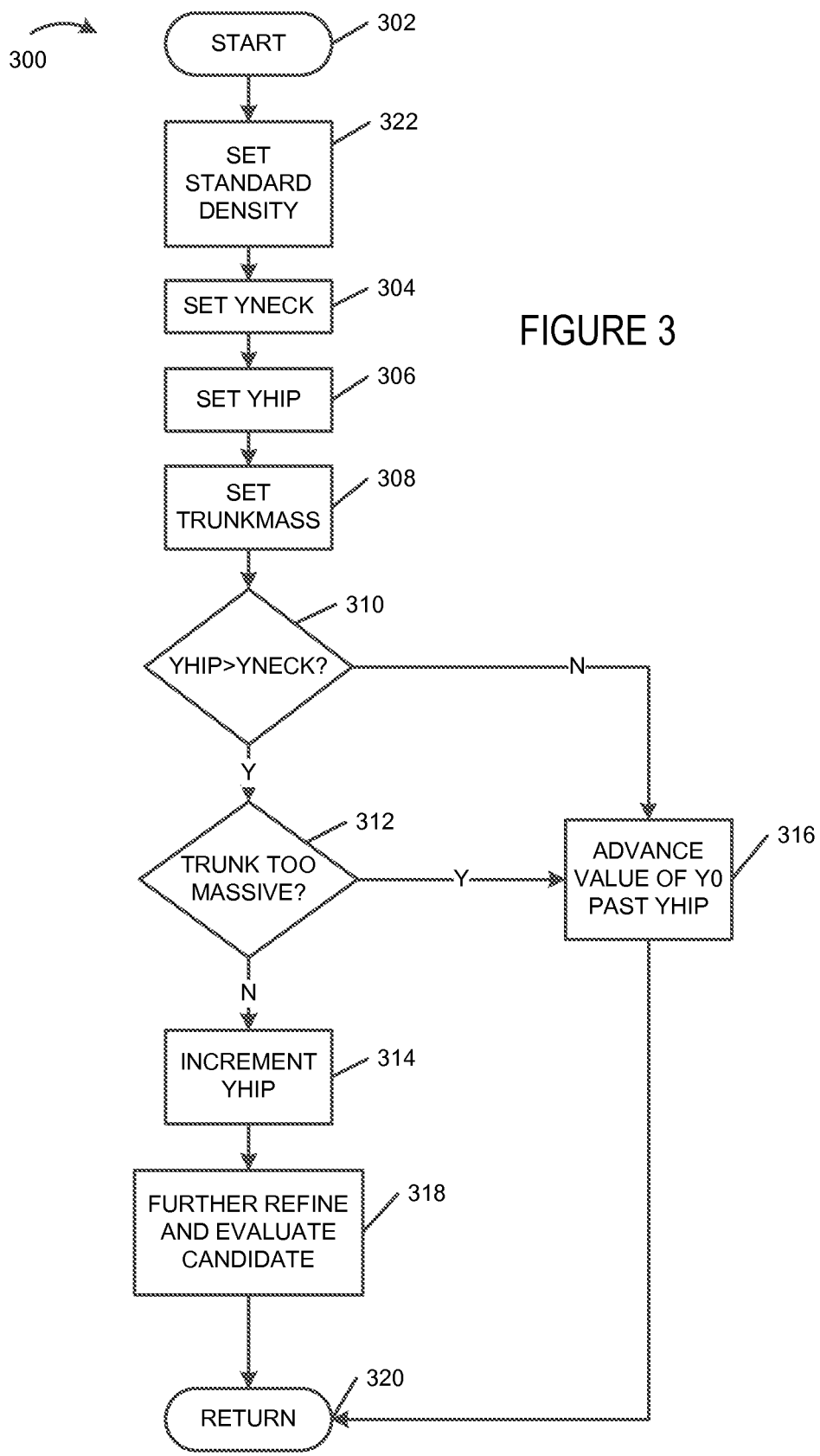
FIG. 3 illustrates an exemplary subroutine used in evaluating a potential text line identified in the profile histogram P in accordance with one embodiment of the present invention.

FIG. 3 illustrates an exemplary subroutine 300 which may be, and in some embodiments of the present invention is, used for implementing step 218 of subroutine 200 of FIG. 2 which refines and evaluates a potential text line identified in the profile histogram P. The subroutine 300 starts at start step 302 with subroutine 300 being executed on processor 1010 from which execution proceeds to step 322. In step 322 a standard density value is calculated as a certain fraction (larger than 1) of the ratio of the total mass of the profile histogram values for rows Y0 through (Y0+SCALE-1) inclusive to the number SCALE of such rows. The value of this fraction may vary but in some embodiments including the exemplary embodiment of the present invention, is set to be 3/2. Processing then proceeds to step 304, wherein the value of YNECK is set to be the smaller of (Y0+ESTTRUNKLTH+ESTHEADLTH) and the first row following Y0 such that the associated mass P[YNECK] is not less than this standard density. YNECK shown in FIG. 900B as row 908B represents the dividing point between the "head" and "trunk" of a putative text line. In exemplary FIG. 900B the rows of pixels forming the head, trunk and leg of the text line "Baby" 902B and its accompanying histogram profile 904B are respectively shown by arrowed lines 907B, 911B and 913B. Processing then proceeds to step 306, wherein the value of YHIP is set to be the largest of YHIP, (Y0+ESTHEADLTH), and the last row preceding (Y0+SCALE) such that the associated mass P[YNECK] is not less than the standard density. YHIP represents the dividing point between the "leg" and "trunk" of a putative text line and is shown in FIG. 900B as row 912B. Once the value of YHIP has been set in step 306, processing proceeds to step 308. In step 308, TRUNKMASS is set to be the sum of the entries in profile histogram P for rows YNECK through YHIP inclusive. Processing then proceeds to decision step 310.

In decision step 310, the value of YHIP is compared to YNECK. If the value of YHIP exceeds that of YNECK, processing proceeds to step 312. Otherwise, the "trunk" is found to have zero length, which is inconsistent with the expected profile of a text line. This putative text line is then abandoned with no further processing being performed in connection with this putative text line but instead processing proceeds to step 316.

In decision step 312, the value of the trunk mass, TRUNKMASS, is compared against a fraction of the product of (YHIP-YNECK) and the number of columns in the image (i.e., the number of pixels in rows YNECK through (YHIP) inclusive). The value of this fraction may vary but in some embodiments including the exemplary embodiment of the present invention is set to be 3/4. If the value of TRUNKMASS is larger, the density of black pixels is deemed too high for the expected text line profile and this putative text line is abandoned with no further processing being performed on it. Processing then proceeds to step 316. Otherwise processing proceeds to step 314.

In step 314 the value of YHIP is incremented by 1. Processing then proceeds to step 318. In step 318 the putative text line is further refined and evaluated. Step 318 may be, and in some embodiments including the exemplary embodiment of the present invention is, performed by exemplary subroutine 400 which is described in further detail below. Processing then proceeds to return step 320.

In step 316 the putative text line has failed to meet one or more criteria associated with the expected profile of a text line. The search for text lines proceeds by advancing and setting the value of Y0 to the first row beyond YHIP such that none of the rows from Y0 to (Y0+SCALE-1) inclusive have hitherto been marked as "used". Processing then proceeds to return step 320 of the subroutine where this portion of the processing of the method concludes.

The values set or calculated in this subroutine may be, and in some embodiments including the exemplary embodiment are, stored in memory data/information module 1020 of memory 1008 for later use such as in processing of other steps of the method.

Figure 4:
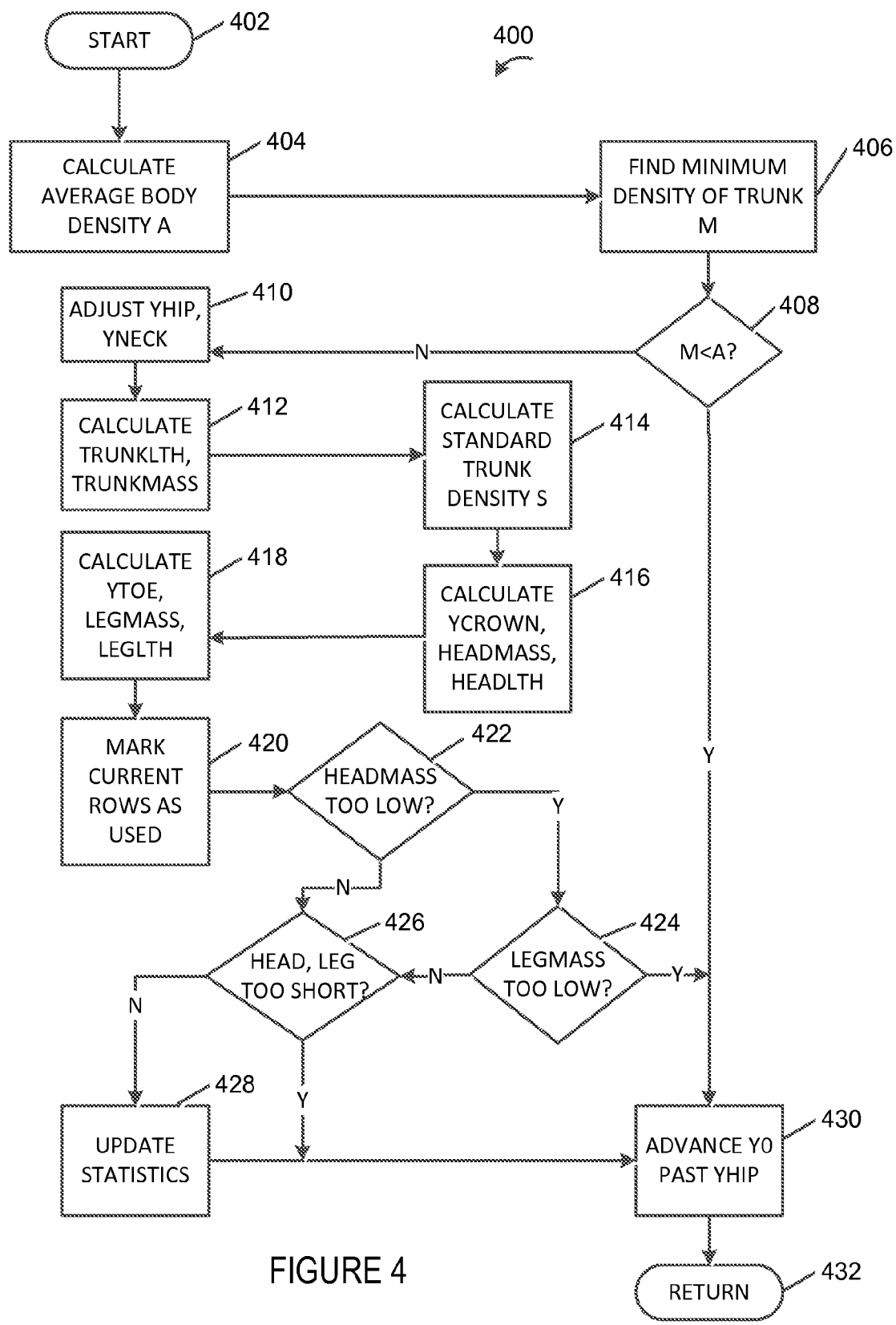
FIG. 4 illustrates an exemplary subroutine used in evaluating a potential text line identified in the profile histogram P in accordance with one embodiment of the present invention.

FIG. 4 illustrates an exemplary subroutine 400 which may be, and in some embodiments of the present invention is, used for implementing step 318 of subroutine 300 of FIG. 3 which further refines and evaluates a potential text line candidate identified in the profile histogram P.

The subroutine 400 starts at start step 402 with subroutine 400 being executed on processor 1010 from which processing proceeds to step 404. In step 404, an average body density value A is calculated as the ratio of the total mass of the profile histogram values for rows Y0 through (Y0+SCALE-1) inclusive to the number SCALE of such rows. Processing then proceeds to step 406. In step 406, a minimum trunk density value M is calculated as the smallest entry in the profile histogram P for the rows from YNECK through YHIP exclusive. Processing then proceeds to decision step 408.

In decision step 408, the value of M is compared against the value of A. If the value of A exceeds the value of M, the profile of the trunk is inconsistent with the expected profile of a text line and the putative text line is abandoned with no further processing being performed on this potential text line instead processing proceeds to step 430. An example of when the value of A is larger than M is when the putative text line is actually two lines of text with a void in the middle instead of one line of text. If the value of M is greater than or equal to A, processing proceeds from decision step 408 to step 410.

In step 410, the values of YNECK and YHIP are adjusted outward. The value of YNECK is decreased by a certain fraction of (YHIP-YNECK) and the value of YHIP is increased by the same amount, except that YNECK cannot be less than the first row of the image and YHIP cannot be greater than the last row of the image. The value of this fraction may vary but in certain embodiments including the exemplary embodiment of the present invention is, set to be 1/15. Processing then proceeds to step 412 where the value of the trunk length, TRUNKLTH, is calculated as (YHIP-YNECK) and the value of the trunk mass, TRUNKMASS, is calculated as the sum of values in the profile histogram P for rows from YNECK to (YHIP-1) inclusive. After the calculation of TRUNKLTH and TRUNKMASS processing proceeds from step 412 to step 414.

In step 414, a standard trunk density value S is calculated as a fraction of the ratio of TRUNKMASS to TRUNKLTH. The value of this fraction may vary but in some embodiments including the exemplary embodiment of the present invention is set to be 1/13. Processing then proceeds to step 416.

In step 416, the values of YCROWN which represents the starting row of a text line profile, which is to say the starting row of the "head" section of the profile, HEADMASS which is the total mass of the "head" section of the profile, and HEADLTH which represents the length of the head of a text line profile are calculated.

Step 416 may be, and in some embodiments including the exemplary embodiment of the present invention is, performed by exemplary subroutine 500 which is described in further detail below. Processing then proceeds to step 418.

In step 418, the values of YTOE, LEGMASS, and LEGLTH are calculated. The value of YCROWN represents the first row of the located text line and the value of YTOE is the last row thereof. The LEGLTH represents the length of the leg of the located text line. Step 418 may be, and in some embodiments including the exemplary embodiment of the present invention is, performed by exemplary subroutine 600 which is described in further detail below. Processing then proceeds to step 420 where the rows from YNECK to (YHIP-1) inclusive are marked as "used". Processing then proceeds to decision step 422.

In decision step 422, the value of HEADMASS is compared against a certain fraction of TRUNKMASS. The value of this fraction may vary but in certain embodiments including the exemplary embodiment of the present invention is set to be 1/50. A larger value of HEADMASS is consistent with the expected profile of a text line. If the HEADMASS is greater than or equal to (1/50)(TRUNKMASS) then processing proceeds to step 426. Otherwise processing proceeds to step 424.

In decision step 424, the value of LEGMASS is compared against a certain fraction of TRUNKMASS. The value of this fraction may vary but in certain embodiments including the exemplary embodiment of the present invention is set to be 1/50. A smaller value of LEGMASS is inconsistent with the expected profile of a text line, the putative text line is abandoned and processing proceeds to step 430. Otherwise processing proceeds to decision step 426.

In decision step 426, the values of HEADLTH and LEGLTH are compared against a certain fraction of the value of TRUNKLTH. The value of this fraction may vary but in some embodiments is taken to be 1/6. If the value of either HEADLTH or LEGLTH or both exceeds this fraction, the profile is deemed to be consistent with the expected profile of a text line and processing proceeds to step 428. Otherwise the profile is deemed inconsistent with the expected profile of a text line and processing proceeds to step 430.

Step 428 is executed only when the located text line has satisfied various criteria associated with the expected profile of a text line. In step 428, values associated with the statics of the image or portion of an image under evaluation are updated including the TOTALSURPLUS and TOTALESTCHARCT.

Step 428 may be, and in some embodiments including the exemplary embodiment of the present invention is, performed by exemplary subroutine 700 which is described in further detail below. Processing then proceeds to step 430.

In step 430 the search for text lines proceeds by advancing and setting the value Y0 to the first row beyond YHIP such that none of the rows from Y0 to (Y0+SCALE-1) inclusive have hitherto been marked as "used". Processing then proceeds to return step 432 of the subroutine where this portion of the processing of the method concludes.

The values set or calculated in this subroutine may be, and in some embodiments including the exemplary embodiment of the present invention are, stored in memory data/information module 1020 of memory 1008 for later use such as in processing of other steps of the method.

Figure 5:
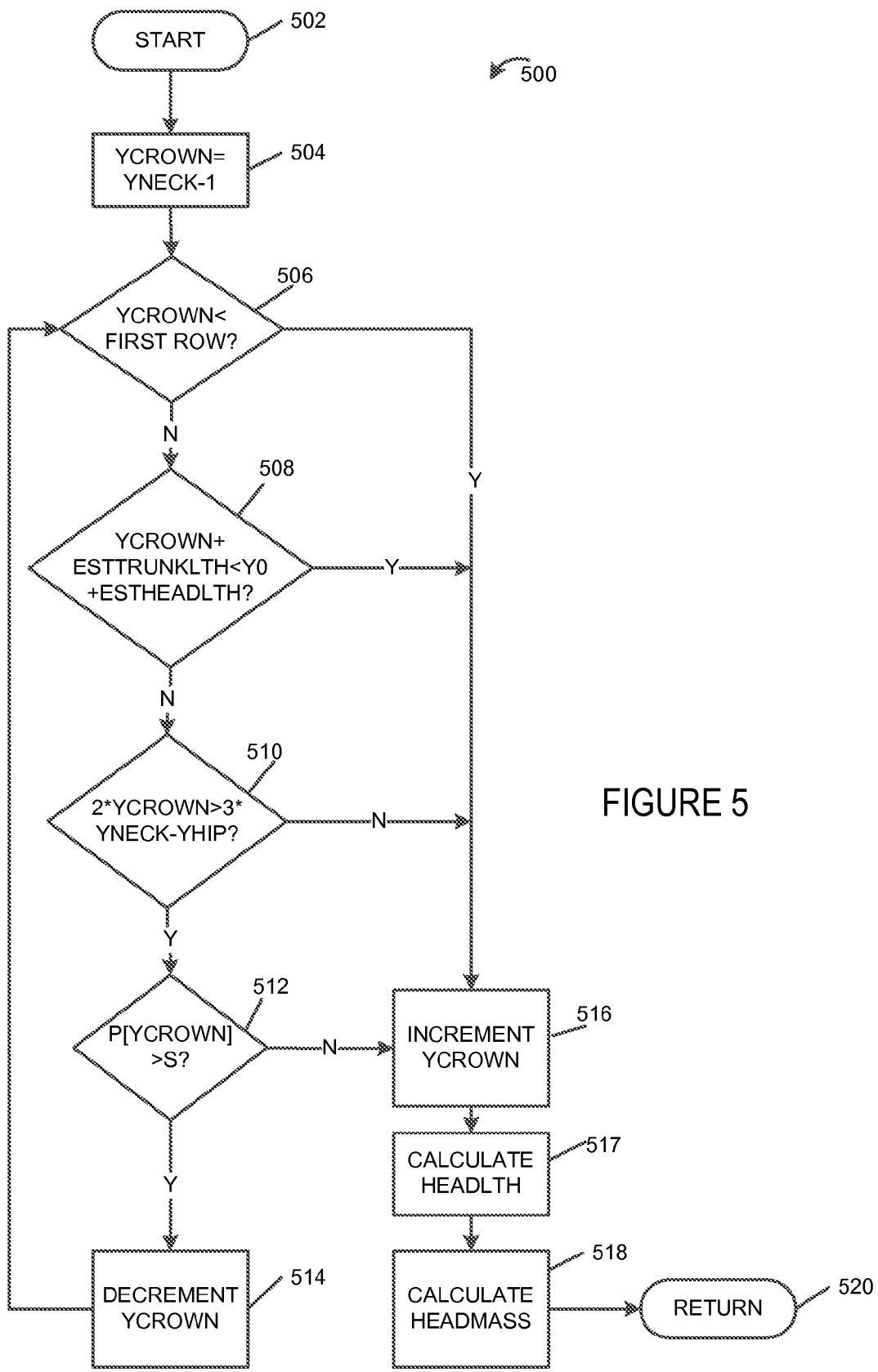
FIG. 5 illustrates an exemplary subroutine which calculates values of YCROWN, HEADMASS and HEADLTH for a potential text line identified in the profile histogram P in accordance with one embodiment of the present invention.

FIG. 5 illustrates an exemplary subroutine 500 which may be, and in some embodiments of the present invention is, used for implementing step 416 of subroutine 400 of FIG. 4 which calculated values of YCROWN, HEADMASS and HEADLTH for a potential text line identified in the profile histogram P.

The subroutine 500 starts at start step 502 with subroutine 500 being executed on processor 1010 from which processing proceeds to step 504. As previously discussed YCROWN is considered to represent the starting row of a text line profile, which is to say the starting row of the "head" section of the profile, while HEADMASS is the total mass of the "head" section of the profile, and HEADLTH is the length of the "head" section of the profile. In step 504, YCROWN is initialized to the value (YNECK-1). Processing then proceeds to decision step 506.

In decision step 506, the value of YCROWN is compared against the first row of the image. If the value of YCROWN is less than the first row of the image, processing proceeds to step 516. If the value of YCROWN is greater than or equal to the first row of the image processing proceeds to decision step 508.

In decision step 508, the value of (YCROWN+ESTTRUNKLTH) is compared against the value of (Y0+ESTHEADLTH). If the value of (YCROWN+ESTTRUNKLTH) is less, processing proceeds to step 516. Otherwise processing proceeds to decision step 510.

In decision step 510, the value of (2*YCROWN) is compared against the value of (3*YNECK-YHIP). If the value of (2*YCROWN) is greater, then processing proceeds to step 512. Otherwise processing proceeds to decision step 516.

In decision step 512, the value of P[YCROWN] is compared against the previously calculated standard trunk density value S. If the value of P[YCROWN] is greater, processing proceeds to step 514. Otherwise processing proceeds to step 516.

In step 514, the value of YCROWN is decremented by 1 and processing proceeds to decision step 506.

In step 516, the value of YCROWN is incremented by 1 and processing then proceeds to step 517. In step 517 the HEADLTH is calculated and set to the value of YNECK-YCROWN. Processing then proceeds to step 518.

In step 518, the value of HEADMASS is calculated and set to the total mass of the profile histogram P for rows from YCROWN to (YNECK-1) inclusive. Processing then proceeds to the return 520 of the subroutine where this portion of the processing of the method concludes.

The values set or calculated in this subroutine may be, and in some embodiments including the exemplary embodiment of the present invention are, stored in memory data/information module 1020 of memory 1008 for later use such as in processing of other steps of the method.

Figure 6:
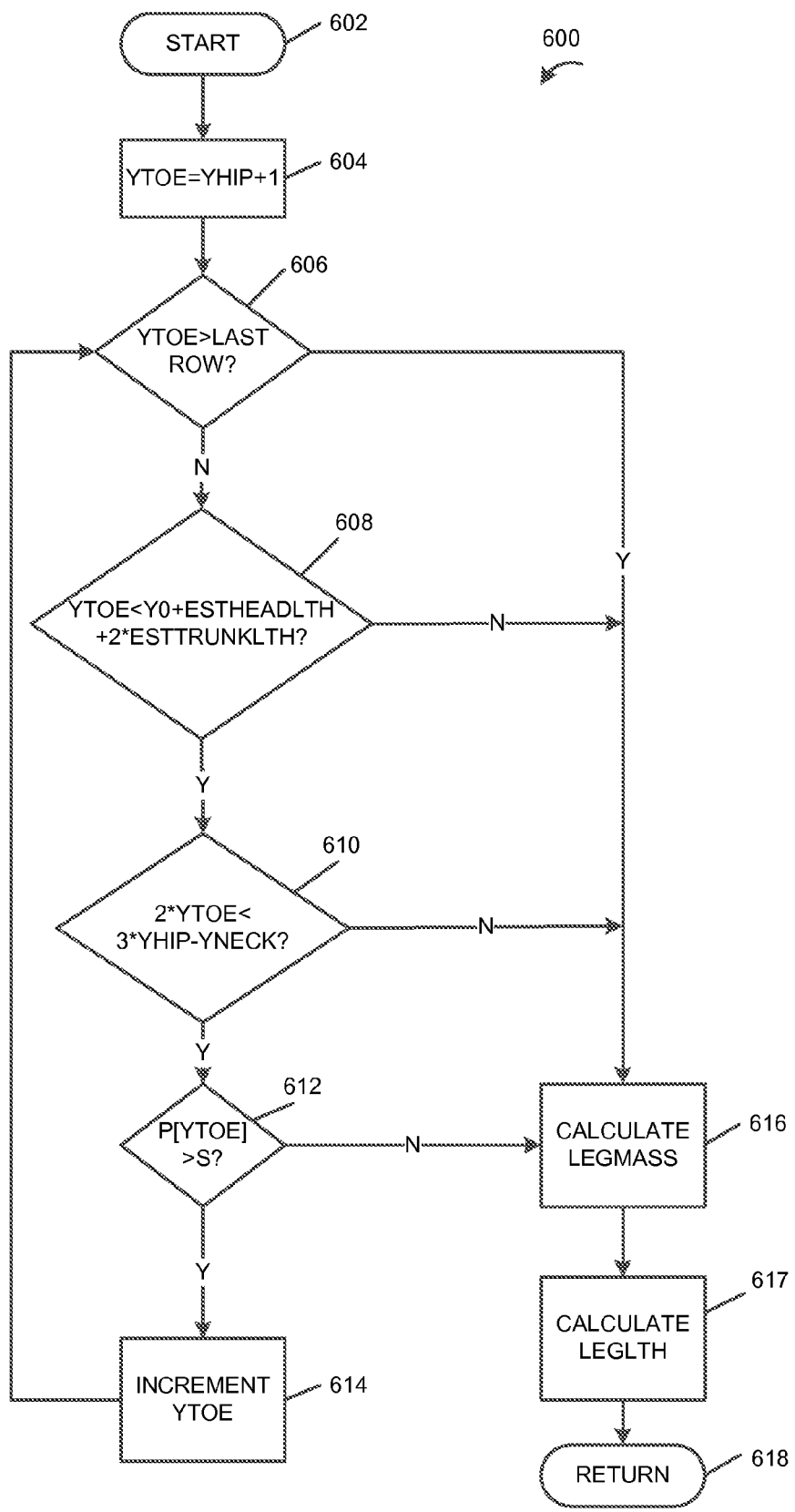
FIG. 6 illustrates an exemplary subroutine which calculates YTOE, LEGMASS, and LEGLTH for a potential text line identified in the profile histogram P in accordance with one embodiment of the present invention.

FIG. 6 illustrates an exemplary subroutine 600 which may be, and in some embodiments of the present invention is, used for implementing step 418 of subroutine 400 of FIG. 4 which calculated values of YTOE, LEGMASS, and LEGLTH for a potential text line identified in the profile histogram P. YTOE represents the final row of a text line profile, which is to say the final row of the "leg" section of the profile, LEGMASS is the total mass of the "leg" section of the profile, and LEGLTH is the length of the "leg" section of the profile.

The subroutine 600 starts at start step 602 with subroutine 600 being executed on processor 1010 from which processing proceeds to step 604. In step 604, YTOE is initialized to the value (YHIP+1). Processing then proceeds to decision step 606.

In decision step 606, the value of YTOE is compared against the value of the last row of the image. If the value of YTOE is greater, processing proceeds to step 616. Otherwise processing proceeds to decision step 608.

In decision step 608, the value of YTOE is compared against the value of (Y0+ESTHEADLTH+2*ESTTRUNKLTH). If the value of YTOE is less, processing proceeds to decision step 610. Otherwise processing proceeds to step 616.

In decision step 610, the value of (2*YTOE) is compared against the value of (3*HIP-YNECK). If the value of (2*YTOE) is less, processing proceeds to decision step 612. Otherwise processing proceeds to step 616.

In decision step 612, the value of P[YTOE] is compared against the previously calculated standard trunk density value S. If the value of P[YTOE] is greater, processing proceeds to step 614. Otherwise processing proceeds to step 616.

In step 614, the value of YTOE is incremented by 1. Processing then proceeds to decision step 606 where the value of YTOE as previously discussed is compared against the value of the last row of the image. If the value of YTOE is greater, processing proceeds to step 616. Otherwise processing proceeds to decision step 608.

In step 616, the value of LEGMASS is calculated and set to the total mass of the profile histogram P for rows from YHIP to (YTOE-1) inclusive. Processing then proceeds to step 617.

In step 617, the value of LEGLTH is calculated and set to the value of YTOE-YHIP. Processing then proceeds to the return 618 of the subroutine where this portion of the processing of the method concludes.

The values set or calculated in this subroutine may be, and in some embodiments including the exemplary embodiment of the present invention are, stored in memory data/information module 1020 of memory 1008 for later use such as in processing of other steps of the method.

Figure 7:
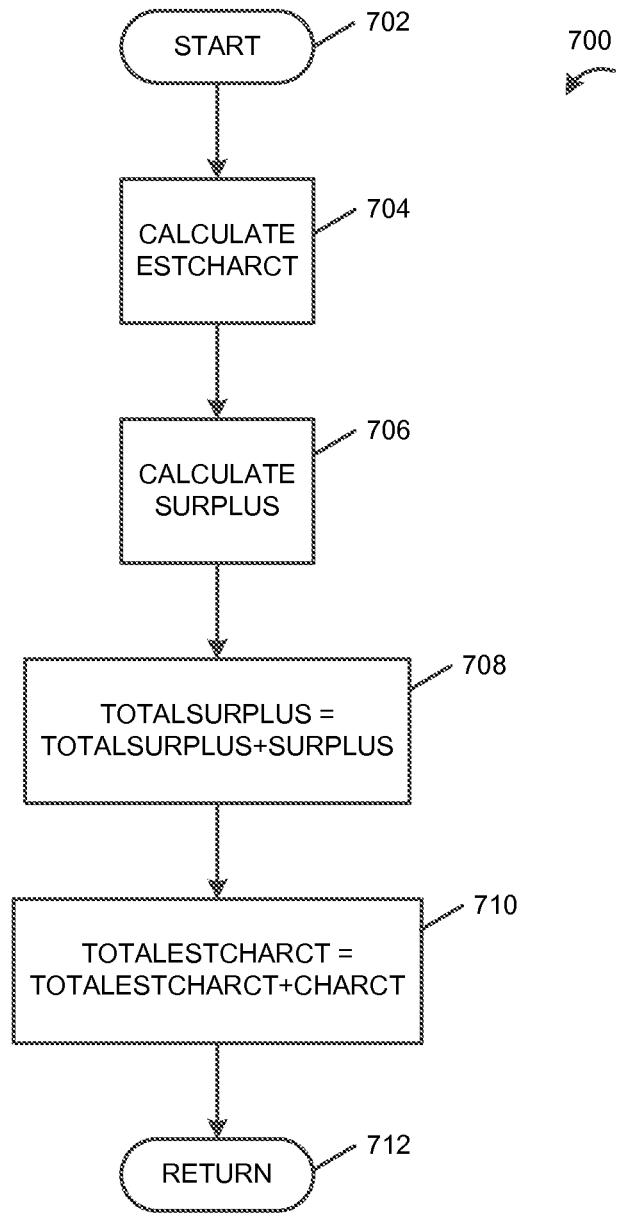
FIG. 7 illustrates an exemplary subroutine which updates image statistics based on the properties of a located text line in accordance with one embodiment of the present invention.

FIG. 7 illustrates an exemplary subroutine 700 which may be, and in some embodiments of the present invention is, used for implementing step 428 of subroutine 400 of FIG. 4 which updates image statistics based on the properties of a located text line. At this point, a text line has been located in the image with associated values of HEADMASS, TRUNKMASS, LEGMASS, and HEADLTH, TRUNKLTH, LEGLTH.

The subroutine 700 starts at start step 702 with subroutine 700 being executed on processor 1010 from which processing proceeds to step 704.

In step 704, an estimated number ESTCHARCT of characters in the line, e.g., estimated count of characters in the line, is calculated as the product of a fraction C2/C3 with the ratio of TRUNKMASS to the square of TRUNKLTH, i.e., ESTCHARCT=(C2/C3)*(TRUNKMASS/(TRUNKLTH)$^2$). The numerator C2 of this fraction represents a standardized value of TRUNKLTH squared while the denominator C3 represents the expected number of black pixels in a character scaled to a standard value of TRUNKLTH. The values of C2 and C3 may vary but in some embodiments including the exemplary embodiment of the present invention C2 is set to be 1024 and C3 is set to be 240. Processing then proceeds to step 706.

In step 706 a value SURPLUS is calculated as the product of (HEADMASS-LEGMASS) and the ratio of C1 to the square of TRUNKLTH, e.g., SURPLUS=((HEADMASS-LEGMASS)*(C1/(TRUNCHLTH)$^2$)). The value of C1 may vary but in some embodiments including the exemplary embodiment of the present invention C1 is set to be 1024. The value SURPLUS is an image statistic based on the cumulative difference between the HEADMASS and the LEGMASS in the histogram profile of the located line of text. Processing then proceeds to step 708.

In step 708 the value the total surplus, TOTALSURPLUS, of all located lines of text in the image are calculated. TOTALSURPLUS is increased by the amount SURPLUS, i.e., TOTALSURPLUS=TOTALSURPLUS+SURPLUS. Processing then proceeds to step 710. In step 710 the value of total estimated number or count of characters located, TOTALESTCHARCT, is increased by the amount ESTCHARCT. Processing then proceeds to return step 712 of the subroutine where this portion of the processing of the method concludes.

The values set or calculated such as TOTALESTCHARCT and TOTALSUPRLUS in this subroutine may be, and in some embodiments including the exemplary embodiment of the present invention are, stored in memory data/information module 1020 of memory 1008 for later use such as in processing of other steps of the method.

Figure 8:
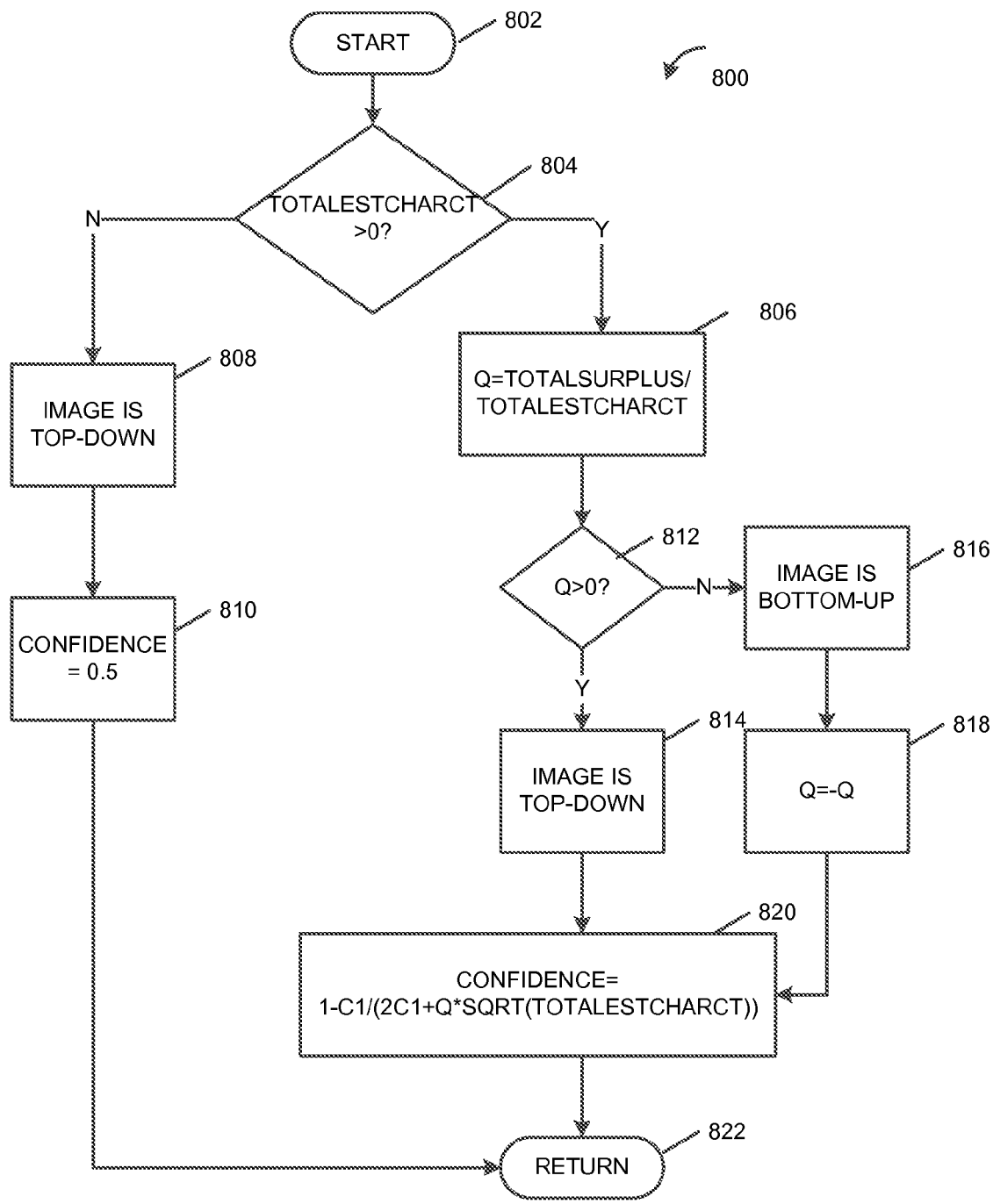
FIG. 8 illustrates an exemplary subroutine which analyzes statistics to determine the orientation of an image in accordance with one embodiment of the present invention.

FIG. 8 illustrates an exemplary subroutine 800 which may be, and in some embodiments of the present invention is, used for implementing step 120 of routine 100 of FIG. 1 which analyzes the values of TOTALSURPLUS and TOTALESTCHARCT to determine the image's or image section's orientation.

The subroutine 800 starts at start step 802 with subroutine 800 being executed on processor 1010 from which processing proceeds to step 804.

In decision step 804, the value of TOTALESTCHARCT is compared to zero. If the value is greater than zero, control proceeds to decision step 806. Otherwise, no usable data was found in the image, and processing proceeds to step 808.

In step 808, the image orientation is arbitrarily set to be top-down or non-inverted. Processing then proceeds to step 810. In step 810, the confidence value is set to 0.5, indicating that the reported result is as likely to be wrong as correct. Processing then proceeds to return step 822 of the subroutine where this portion of the processing of the method concludes.

In step 806, a quotient Q is calculated by dividing TOTALSURPLUS by TOTALESTCHARCT, i.e., Q=TOTALSURPLUS/TOTALESTCHARCT. Processing then proceeds to decision step 812.

In decision step 812, the value of Q is compared to 0. If Q>0, processing proceeds to step 814. Otherwise, processing proceeds to step 816.

In step 814, the image orientation is set to be top-down or non-inverting. Processing then proceeds to return step 820 wherein the confidence value is determined.

In step 816, the image orientation is set to be bottom-up or inverted. Processing then proceeds to step 818. In step 818, the value of Q is made positive by reversing its sign, i.e. Q=-Q. Processing then proceeds to step 820 where the confidence value is determined.

In step 820, a confidence value is calculated and set by the following equation, CONFIDENCE=1−C1/(2*C1+Q*SQRT(TOTALESTCH-ARCT)), where C1 is a parameter whose value may vary but in some embodiments including the exemplary embodiment of the present invention is set to be 56. Processing then proceeds to return step 822 of the subroutine where this portion of the processing of the method concludes.

The values set or calculated in this subroutine such as for example, the value of the confidence in the correctness of the reported image orientation and the image orientation, may be, and in some embodiments including the exemplary embodiment of the present invention are, stored in memory data/information module 1020 of memory 1008 for later use such as in additional image processing. For example, based on the confidence value and image orientation reported the analyzed image may be, and in sometimes of the present invention, are inverted. This may, and in some embodiments, does occur when the reported image's orientation is upside down or inverted and the confidence value is greater than 0.5. The confidence value is a value representing the probability that the reported orientation is correct with 0 being a 100% probability that the image has been reported incorrectly and 1 being a 100% probability that the reported oriented is correct. A 0.5 confidence level indicates that orientation is equally likely to be incorrect as it is to be correct.

Figure 11A:
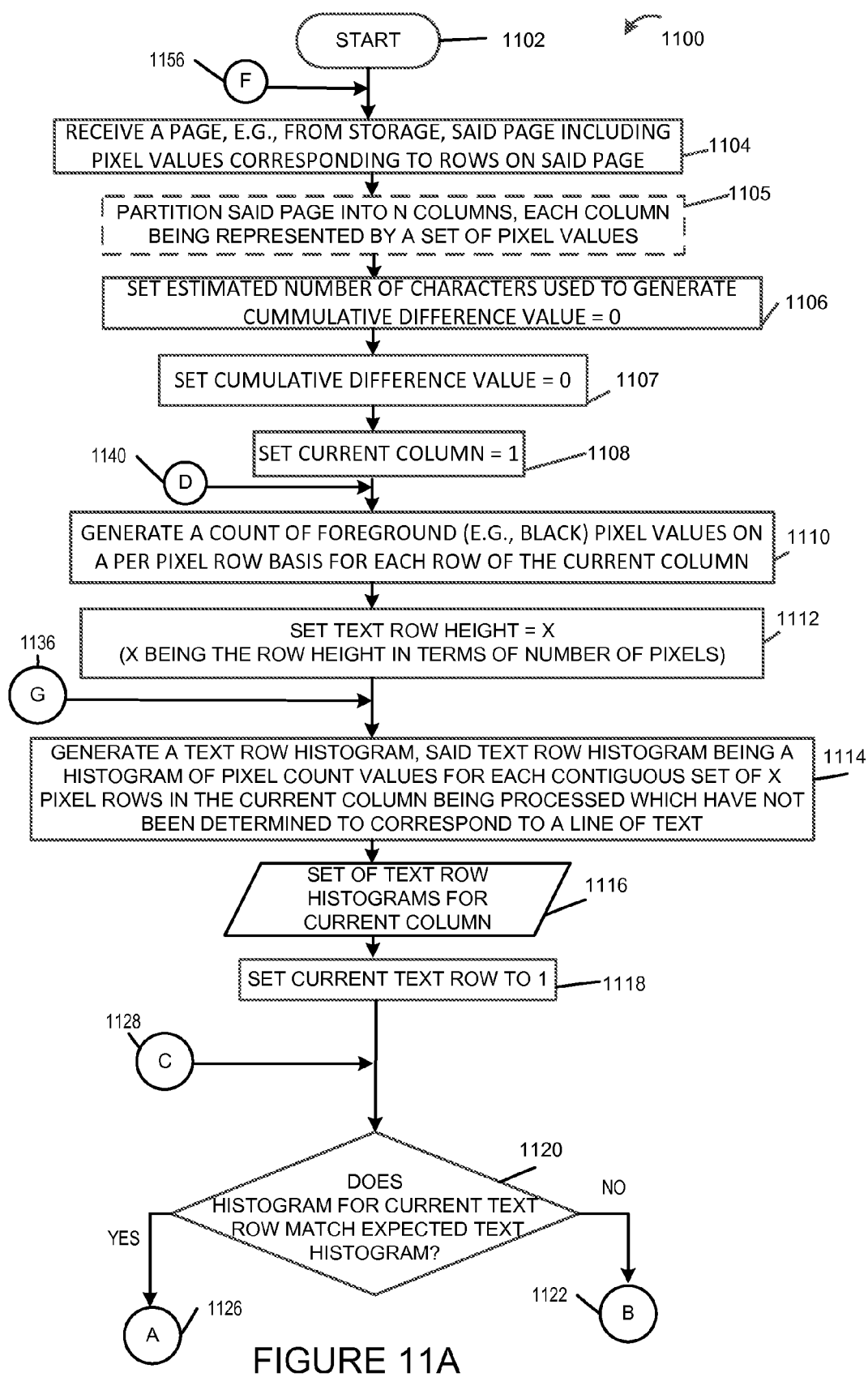
FIG. 11A which is a first part of FIG. 11 illustrates a first portion of an exemplary method in accordance with one embodiment of the present invention.
Figure 11B:
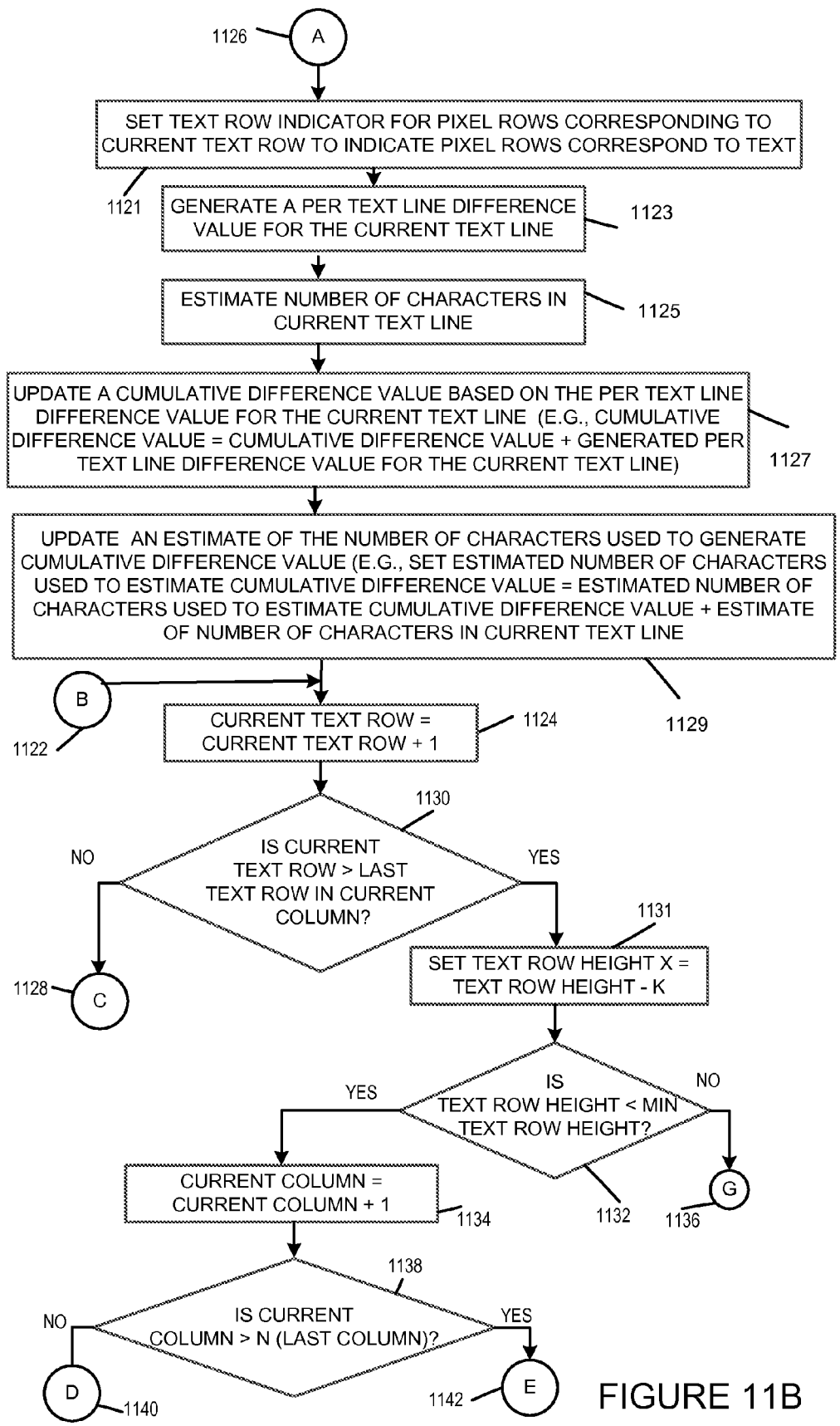
FIG. 11B which a second part of FIG. 11 illustrates a second portion of an exemplary method in accordance with one embodiment of the present invention.
Figure 11C:
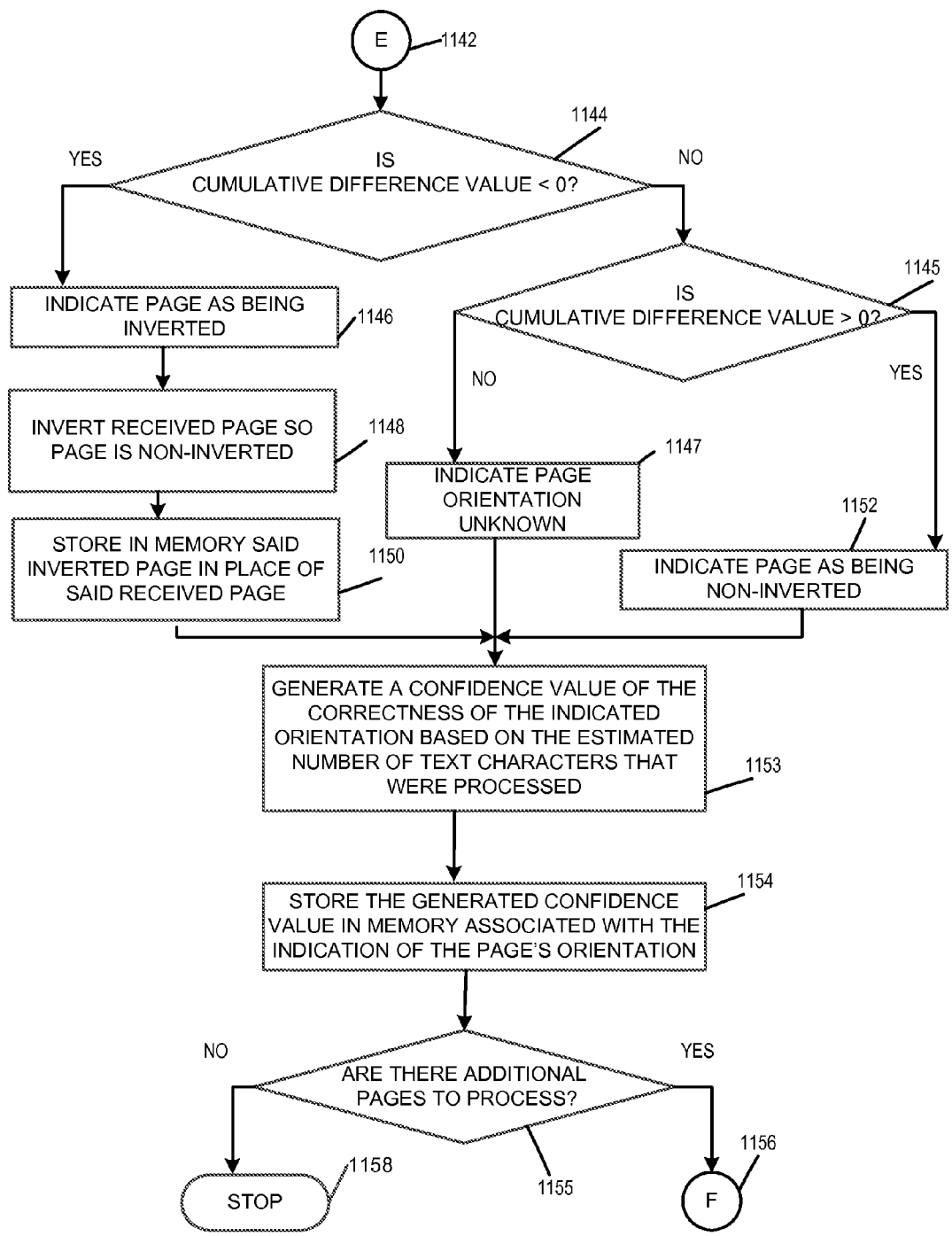
FIG. 11C which a third part of FIG. 11 illustrates a third portion of an exemplary method in accordance with one embodiment of the present invention.

FIG. 11 which includes FIGS. 11A, 11B and 11C illustrates a method 1100 which may be, and is, used to implement some embodiments of the present invention. The steps of method 1100 may be, and in some embodiments of the present invention are implemented using the computer system 1000 illustrated in FIG. 10. The method begins at start step 1102 with the method 1100 being executed by the processor 1010.

From start step 1102 processing proceeds to step 1104 where a page in the form of image data is received, e.g., from data/information module 1020 of memory storage 1008. The page of data includes pixel values corresponding to rows on the page. From step 1104 processing proceeds to optional step 1105 wherein the received page of image data is partitioned into N columns to be analyzed. Each column of image data of the page being represented by a set of pixel values. N is initialized as 1 so that if this optional step is skipped then the page will be treated as a single column of image data. Processing proceeds from column partitioning step 1105 to step 1106 where the estimated number of text characters used to generate the cumulative difference value is set to equal 0. Processing then proceeds to step 1107 where the cumulative difference value is set equal to 0. Processing then proceeds to step 1108 wherein the variable current column is set to 1. Processing then proceeds to step 1110.

In step 1110, processor 1010 operates on the image data of the current column being analyzed and generates a count of foreground (e.g., black) pixel vales on a per pixel row basis for each row of the current column. Processing then proceeds to step 1112. In step 1112, the text row height is set to X. X being the row height of a potential line of text in terms of number of pixels. Processing then proceeds from step 1112 to step 1114. In step 1114 a text row histogram is generated. The text row histogram being a histogram of pixel count values for each contiguous set of X pixel rows in the current column being processed which have not been determined to correspond to a line of text. The set of text row histograms 1116 for the current column generated in step 1114 may be, and in some embodiments is, stored in data/information module 1020 of memory 1008 for later use for example by other steps of the method.

From step 1114 processing proceeds to step 1118 where the current text row is set to equal 1. Processing then proceeds to decision step 1120.

In decision step 1120 the histogram for the current text row is compared to the expected profile of a text histogram. If the histogram for the current text row matches the expected profile of a text histogram processing proceeds to step 1121 in FIG. 11B via connection node A 1126. If the histogram for the current text row does not match the expected profile of a text histogram then processing proceeds from decision step 1120 to step 1124 in FIG. 11B via connection node B 1122.

Figure 12:
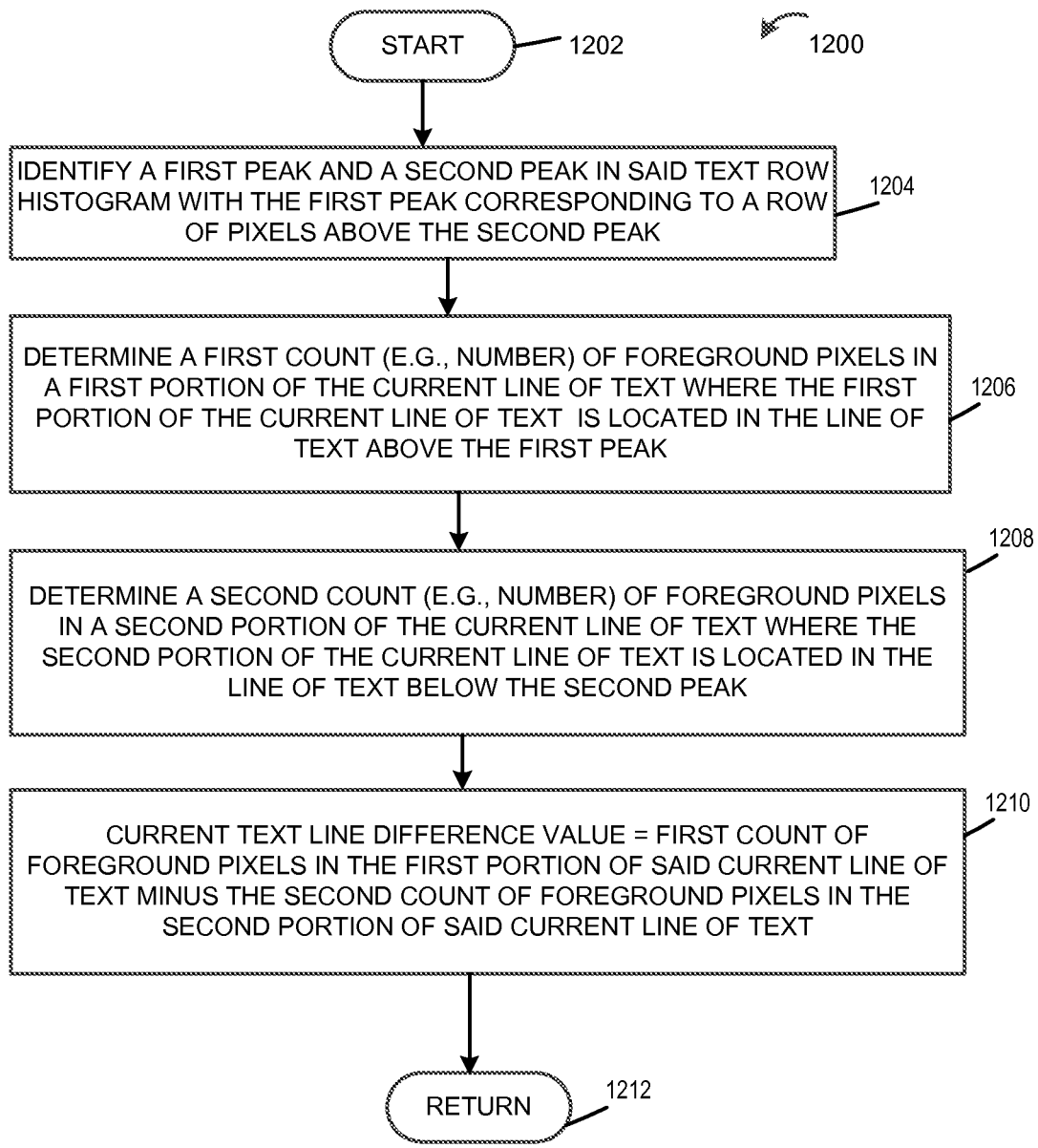
FIG. 12 illustrates an exemplary subroutine which analyzes text row image data.

In step 1121, processor 1010 sets the text row indicator for pixel rows corresponding to the current text row to indicate pixel rows corresponding to text. All text row indicators for pixel rows were initially set to be unused by the system. After a pixel row has been identified as part of a line of text it is indicated as corresponding to text and that it is no longer unused by the system. From step 1121 processing proceeds to step 1123. In step 1123 a per text line difference value is generated for the current text line. In some embodiments of the present invention, the exemplary subroutine 1200 illustrated in FIG. 12 is utilized to implement step 1123. The details of subroutine 1200 are discussed in further detail in connection with FIG. 12. Processing proceeds from step 1123 to step 1125.

In step 1125, an estimate is generated of the number of characters in the current line of text. Processing then proceeds to step 1127 wherein the cumulative difference value is updated based on the per text line difference value generated for the current text line, e.g., cumulative difference value=cumulative difference value+the text line difference value that was generated for the current line in step 1123. Processing then proceeds to step 1129.

In step 1129, the estimate of the number of characters, e.g., text characters, used to generate the cumulative difference value is updated, e.g., by setting the estimated number of characters used to estimate the difference value=the estimated number of characters used to estimate the difference value+the estimate of number of characters in the current text line. Processing then proceeds to step 1124.

In step 1124 the value of the current text row is incremented by 1 and processing proceeds to decision step 1130. In decision step 1130, the current text row value is tested to determine whether the value of the current text row is beyond the last row in the current column. If the value of the current text row is not greater than the last text row in the current column processing proceeds to decision step 1120 of FIG. 11A via connection node C 1128 where processing continues as previously discussed. If the value of the current text row is greater than the last text row in the current column then processing proceeds to step 1131. In step 1131, the value of the text row height X is reduced by an amount K, where K is a variable set to be an integer value such as 1 or greater, i.e., text row height X=text row height X-K therein reducing the height, i.e., the number of pixel rows, to be evaluated when determining if a set of rows are a line of text. For example, in some embodiments K is set to the value 1 wherein the text row height X=text row height X-1.

Processing then proceeds from step 1131 to decision step 1132 wherein if the text row height X is less than the minimum text row height processing proceeds to step 1134. In step 1132, if the text row height X is not less than the minimum text row height processing proceeds to step 1114 of FIG. 11A via connection node G 1136 where the processor 1010 operates to generate a text row histogram for evaluation as previously described and processing continues from this step also as previously described.

In step 1134, the current column value is incremented by 1 and processing then proceeds to decision step 1138 where the current column value is compared to N the last column value. If the current column is greater than N then processing proceeds to decision step 1144 of FIG. 11C via connection node E 1142. If the current column value is not greater than N processing proceeds to step 1110 of FIG. 11A via connection node D 1140 where the processor 1010 operates to generate a count of foreground pixel values on a per pixel row basis as previously discussed. Processing continues from step 1110 as previously discussed.

In decision step 1144, the cumulative difference value is compared to zero. If the cumulative difference value is less than zero then the page is determined to have an inverted orientation and processing proceeds to step 1146. In step 1144, if the cumulative difference value is not less than zero then processing proceeds to decision step 1145.

In decision step 1145, the cumulative difference value is compared to zero and if it is greater than zero then the image is determined to be in a non-inverted or right side up orientation. Processing then proceeds to step 1152.

In step 1152, the page is indicated as being non-inverted and this indication, may be, and in some embodiments is, stored in memory module 1020 of memory 1008 and associated with the page of text under evaluation. This page orientation information may be, and in some embodiments is, used in additional image processing for example such as in determining the orientation of additional pages in a multi-page document when the orientation of the additional pages are ambiguous. Processing proceeds from step 1152 to step 1153.

If the cumulative difference value is not greater than zero in decision step 1145 processing proceeds to step 1147 where the page orientation is indicated as unknown and this indication may be, and in some embodiments is, stored in memory module 1020 of memory 1008 and associated with the page of text under evaluation. In some alternative embodiments the page is indicated in step 1147 as non-inverted with a probability indication that the non-inverting orientation is as likely to be correct as a non-inverting orientation and this information is stored in memory module 1020 of memory 1008. From step 1147 processing proceeds to step 1153. In some embodiments processing proceeds directly from step 1147 to step 1155 and the confidence value generation and storage steps are bypassed.

In step 1146 the page orientation is indicated as being inverted and this indication, may be, and in some embodiments is, stored in memory module 1020 of memory 1008 and associated with the page of text under evaluation. This information may and in some embodiments of the present invention is, used for additional image processing in connection with multi-page documents in determining additional pages orientation such as for example when additional pages of the document have ambiguous page orientations.

Processing proceeds from step 1146 to step 1148 where the received page is inverted so that the page is now in a non-inverted orientation. Processing then proceeds to step 1150 where processor 1010 replaces, e.g., stores, in memory data/information module 1020 of memory 1008 the received page which was determined to have an inverted orientation with the non-inverted page generated in step 1148. Processing then proceeds to decision step 1153.

In step 1153, a confidence value of the correctness of the indicated page's orientation based on the estimated number of text characters that were processed is generated. The confidence value may be, and in some embodiments is, a confidence measure and/or a metric such as for example, a statistical probability of the correctness of the indicated orientation of the page. In some embodiments of the present invention, the confidence measure indicates the level of confidence that the decision as to whether the page is inverted or not inverted is correct with the confidence measure or value being higher when said estimate of the number of text characters that were processed is a first value which is higher than a second value. That is more confidence is indicated for a larger number of processed characters.

Processing proceeds from step 1153 to step 1154 wherein the generated confidence value, e.g., measure and/or metric is stored in memory data/information module 1020 of memory 1008 associated with the indication of the page's orientation. This information may be, and in some embodiments, is used for example in later image processing routines and/or statistical analysis. Processing proceeds from step 1154 to decision step 1155.

In decision step 1155 a check is made to determine whether there are additional pages to be processed. If there are additional pages to be processed then processing proceeds from decision step 1155 to step 1104 of FIG. 11A via connection node F 1156 where processing continues as previously discussed. If there are no additional pages to be processed processing proceeds to stop step 1158 wherein processing relating to method 1100 is concluded but additional processing of the page and its data content may continue.

FIG. 12 illustrates an exemplary subroutine 1200 which may be, and in some embodiments of the present invention is, used for implementing step 1123 of FIG. 11B which generates a per text line difference value for the current text line under evaluation. The subroutine 1200 is executed by processor 1010 and begins at start step 1202.

From start step 1202 processing proceeds to step 1204 where a first peak and a second peak in said text row histogram are identified. The first peak corresponding to a row of pixels above the second peak. From step 1204 processing proceeds to determination step 1206. In step 1206, a first count, e.g., number, of foreground pixels in a first portion of the current line of text is determined. The first portion of the current line of text being located in the line of text above the first peak. For example, the first portion of the current line of text is in some embodiments equal to or based upon the head or upper tail of the line of text. Processing then proceeds to determination step 1208.

In step 1208, a second count, e.g., number, of foreground pixels in a second portion of the current line of text is determined. The second portion of the current line of text being located in the line of text below said second peak. For example, the second portion of the current line of text is in some embodiments equal to or based upon the leg or lower tail of the line of text.

In some but not all embodiments of the present invention the first and second portions of the current line of text are of equal horizontal length. In some embodiments the first and second portions of the current line of text in addition to being of equal horizontal length also correspond to the full horizontal length of said current line of text. In some embodiments of the present invention the first and second portions of the current line of text are not of equal portions but together correspond to the full horizontal length of the current line of text.

Processing proceeds from step 1208 to step 1210. In step 1210, the current text line difference value is generated e.g., current text line difference value is set equal to the first count of foreground pixels in the first portion of the current line of text minus the second count of foreground pixels in the second portion of the current line of text. Processing proceeds from step 1210 to return step 1212 where this portion of the processing of the method concludes but processing of the method 1100 continues.

The values set or calculated in this subroutine such as for example, the value of the current text line difference value may be, and in some embodiments of the present invention are, stored in memory data/information module 1020 of memory 1008 for later use such as in additional image processing associated with determining the orientation of the image of the page being evaluated.

In some but not all embodiments of the present invention as implemented in accordance with the method 1100 illustrated in FIG. 11, the step of identifying the current line of text as a line of text includes determining if a count of the number of foreground pixel values included in rows of said column between and including the first and second peaks exceeds both the first and second counts of pixel values determined in subroutine 1200 illustrated in FIG. 12.

In some embodiments of the present invention the rows of foreground pixels forming the first and second peaks of the text line are included in the pixel count of the first and second portion of the text line. In some embodiments of the present invention the rows of foreground pixels forming the first and second peaks of the text line are excluded from the pixel count of the first and second portion of the text line.

Figure 16:
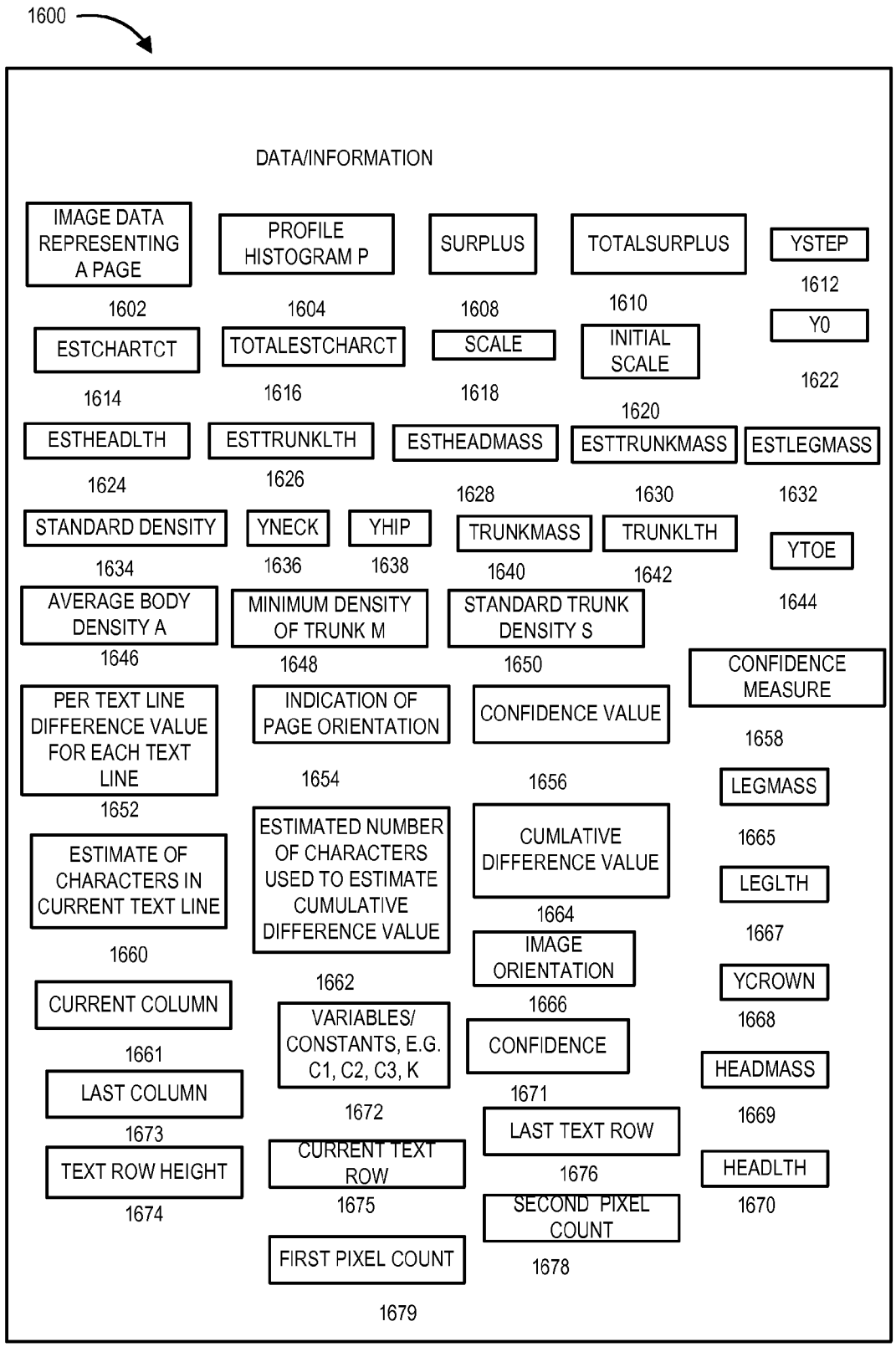
FIG. 16 illustrates exemplary data/information that may be, and in some embodiments of the present invention, is stored in memory.

FIG. 16 illustrates exemplary data/information that may be, and in some embodiments is, used and stored in memory in connection with the image processing for identifying the orientation of an image and re-orienting an image in accordance with some embodiments of the present invention. The exemplary data/information 1600 may be, and in some embodiments is, stored in the data/information 1020 section of memory 1008 of FIG. 10. Data/information 1600 contains the following exemplary data/information elements: IMAGE DATA REPRESENTING A PAGE 1602, PROFILE HISTOGRAM P 1604, SURPLUS 1608, TOTALSURPLUS 1610, YSTEP 1612, ESTCHARCT 1614, TOTALESTCHARCT 1616, SCALE 1618, INITIAL SCALE 1620, Y0 1622, ESTHEADLTH 1624, ESTTRUNKLTH 1626, ESTHEADMASS 1628, ESTTRUNKMASS 1630, ESTLEGMASS 1632, STANDARD DENSITY 1634, YNECK 1636, YHIP 1638, TRUNKMASS 16400, TRUNKLTH 1642, YTOE 1644, AVERAGE BODY DENSITY A 1646, MINIMUM DENSITY OF TRUNK M 1648, STANDARD TRUNK DENSITY S 1650, PER TEXT LINE DIFFERENCE VALUE FOR EACH TEXT LINE 1652, INDICATION OF PAGE ORIENTATION 1654, CONFIDENCE VALUE 1656, CONFIDENCE MEASURE 1658, ESTIMATE OF CHARACTERS IN CURRENT TEXT LINE 1660, ESTIMATED NUMBER OF CHARACTERS USED TO ESTIMATE CUMULATIVE DIFFERENCE VALUE 1662, CUMULATIVE DIFFERENCE VALUE 1664, LEGLTH 1667, CURRENT COLUMN 1661, CONFIDENCE 1671, YCROWN 1668, HEADMASS 1669, TEXT ROW HEIGHT 1674, CURRENT TEXT ROW 1675, LAST TEXT ROW 1676, HEADLTH 1670, FIRST PIXEL COUNT 1679, SECOND PIXEL COUNT 1678, and VARIABLES/CONSTANTS, e.g., C1, C2, C3, K 1672 which represents various variables and constants used in the main routine and subroutines.

Figure 17:
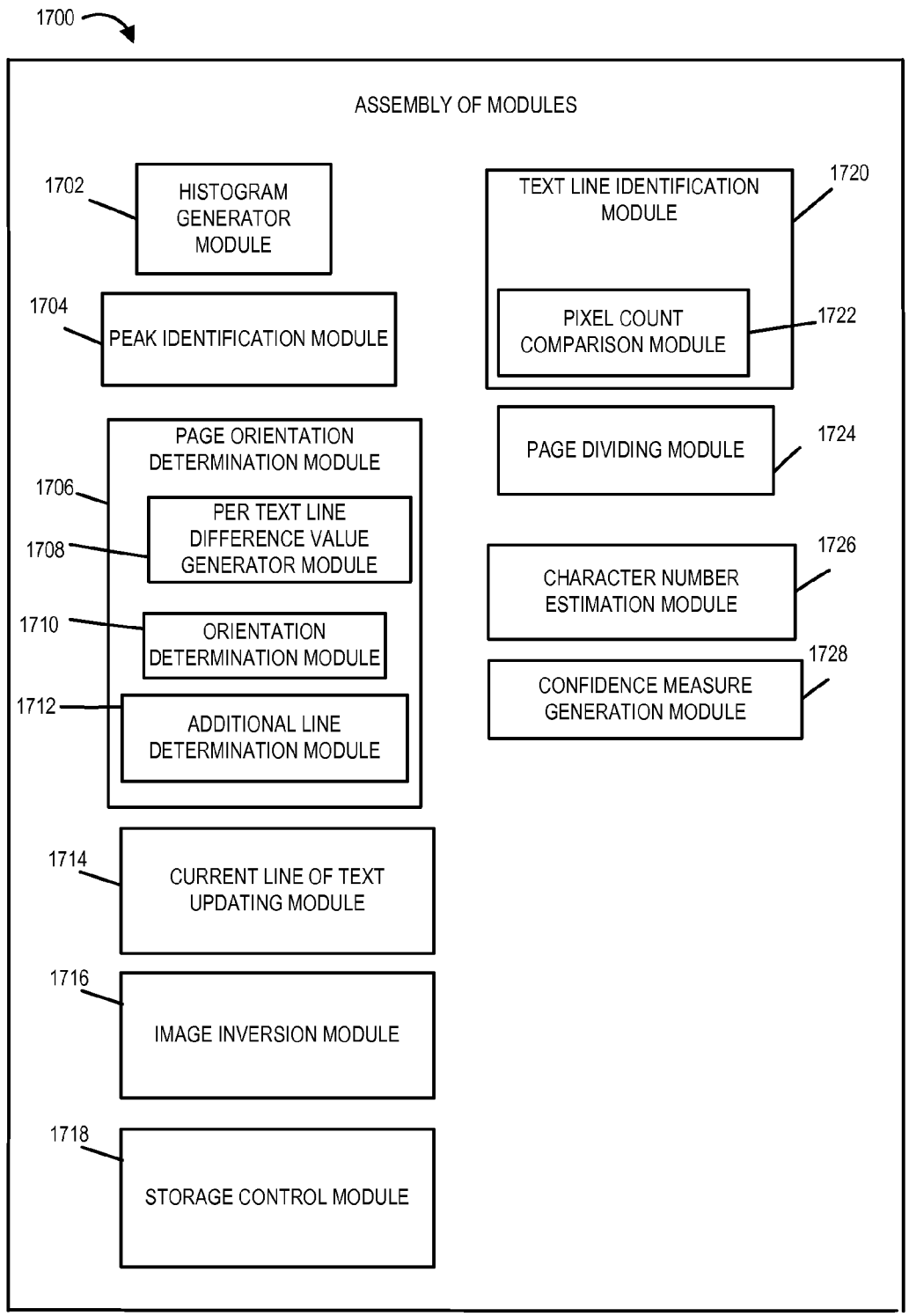
FIG. 17 illustrates an exemplary assembly of modules, which may and in some embodiments is part of an apparatus which implements the method of the invention, for performing various functions in identifying the orientation of an image and re-orienting an image in accordance with an exemplary embodiment.

FIG. 17 illustrates an exemplary assembly of modules 1700 for performing various functions in identifying the orientation of an image and re-orienting an image in accordance with one embodiment of the present invention. In a hardware only embodiment the modules of FIG. 17 would be implemented in hardware, e.g., as circuits, the combination of which comprise an apparatus. In a software based embodiment the modules of FIG. 17 would be implemented as software modules, including code in the form of computer executable instructions, stored in memory in an apparatus. The apparatus also includes a computer, e.g., processor, which executes the code included in the software modules to perform the functions corresponding to the modules a display, an input device, an output device and a bus for coupling the elements of the apparatus together. The memory stores the page in the form of image data before and after processing. The processed page or pages may, and in some embodiment are, parts of a document stored in the memory of the apparatus.

The FIG. 17 assembly of modules 1700 may, and in some embodiments is, used to process a page in the form of an image, said page including lines of text, e.g., represented by horizontal rows of binary pixel values. In the FIG. 17 example, the assembly of modules includes a histogram generator module 1702 configured to generate a histogram of foreground pixel counts corresponding to a current line of text of said page being processed where said foreground pixel counts correspond to different rows of pixels corresponding to said current line of text, a peak identification module 1704 configured to identify a first peak and a second peak in said histogram where said first peak corresponds to a row of pixels above said second peak, and a page orientation determination module 1706 configured to determine if the page is inverted or non-inverted based on a difference between a first count of foreground pixels in a first portion of said current line of text and a second count of foreground pixels in a second portion of said current line of text where the first portion is located in said line of text above said first peak and the second portion is located in said line of text below said second peak.

In the FIG. 17 example the page orientation determination module 1706 includes a per text line difference value generation module 1708 configured to generate a per text line difference value where the per text line difference value is the difference between the first count of foreground pixels in the first portion of said current line of text and the second count of foreground pixels in the second portion of said current line of text. The page orientation determination module 1706 further includes an orientation determination module 1710 configured to determine if said page is inverted or non-inverted based on updating a cumulative difference value based on said per text line difference value and an additional line determination module 1712 configured to determine if additional lines of text of said page are to be processed.

In at least some embodiments the orientation determination module 1710 is configured to determine if said page is inverted or non-inverted following a determination by said additional line determination module 1712 that no additional lines of text of said page are to be processed and to make a decision as to whether said page is inverted or not inverted based on the value of said cumulative difference value. In at least some embodiments the orientation determination module 1710 is configured to determine that said page is not inverted when said cumulative difference value is positive and to determine that said page is inverted when said cumulative difference value is negative.

The assembly of modules 1700 further includes a character number estimation module 1726 configured to estimate a number of text characters that were processed in generating said cumulative difference value and a confidence measure generation module 1728 configured to generate a confidence measure based on the estimated number of text characters that were processed.

In at least one embodiment the confidence metric generation module 1728 is configured to generate a confidence measure value that indicates a level of confidence that said decision, as to whether said page is inverted or not inverted, is correct, said generated confidence measure value being higher when said estimate of the number of text characters that were processed is a first value which is higher than a second value.

In various embodiments the first and second portions of said current line of text are of equal horizontal length and correspond to the full horizontal length of the current line of text.

The assembly of modules 1700 further includes a current line of text updating module 1714 for setting said current line of text to a new line of text, an image inversion module 1716 configured to invert said page is determined to be inverted; and a storage control module 1718 configured to store, in memory, said inverted page in place of said page. In some embodiments the assembly of modules 1700 includes a text line identification module 1720 configured to determine if a portion of an image is a line of text based on said generated histogram. In other embodiments text line identification techniques are used which do not depend on or use said histogram. For example in some implementations text line spacing is predetermined and known based on the document format and the location of the text lines known for a particular document, e.g., set of forms, before processing of a page corresponding to the document.

In some embodiments the text line identification module 1720 includes a pixel count comparison module 1722 configured to determine if a count of the number of foreground pixel values included in rows of said column between and including said first and second peaks exceeds both said first and second counts of pixel values.

While in some implementations a page is treated as being a single column, in some embodiments the assembly of modules 1700 includes a page dividing module 1724 configured to divide said page into a plurality of columns prior to processing by said text line identification module 1720.

The assembly of modules 1700 may and in some embodiments does include additional modules such as an input and/or output control module, a display module for causing the display of processed pages on a display device and/or for performing other operations such as a transmission module for transmitting a file including a stored document including one or more re-oriented pages which were generated by processing multiple pages of a scanned document using the apparatus of the present invention.

Various functions of the present invention may be and are implemented as modules in some embodiments. The assembly of modules 1700 shown in FIG. 17 illustrates an exemplary assembly of modules, e.g., software or hardware modules, that may be and are used for performing various functions of an image processing system used to process images representing pages in some embodiments of the present invention. When the modules identified in FIG. 17 are implemented as software modules they may be, and in some embodiments of the present invention are, stored in memory 1008 of FIG. 10 in the section of memory identified as assembly of modules 1018. These modules may be implemented instead as hardware modules, e.g., circuits.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., an image data processing system. Various embodiments are also directed to methods, e.g., a method of processing image data. Various embodiments are also directed to non-transitory machine, e.g., computer, readable medium, e.g., ROM, RAM, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of processing a page in the form of an image, said page including lines of text, the method comprising:
   generating a histogram of foreground pixel counts corresponding to a current line of text of said page being processed, said foreground pixel counts corresponding to different rows of pixels corresponding to said current line of text;
   identifying a first peak and a second peak in said histogram, said first peak corresponding to a row of pixels above said second peak;
   determining if said page is inverted or non-inverted based on a difference between a first count of foreground pixels in a first portion of said current line of text and a second count of foreground pixels in a second portion of said current line of text, said first portion being located in said line of text above said first peak, said second portion being located in said line of text below said second peak.

2. The method of claim 1, wherein determining if said page is inverted or non-inverted includes:
   generating a per text line difference value, said per text line difference value being said difference between the first count of foreground pixels in the first portion of said current line of text and the second count of foreground pixels in the second portion of said current line of text.

3. The method of claim 2, wherein determining if said page is inverted or non-inverted further includes:

updating a cumulative difference value based on said per text line difference value.

4. The method of claim 3, wherein determining if said page is inverted or non-inverted further includes:
   determining if additional lines of text of said page are to be processed; and
   following determining that no additional lines of text of said page are to be processed, making a decision as to whether said page is inverted or not inverted based on the value of said cumulative difference value.

5. The method of claim 4, wherein making a decision as to whether said page is inverted or not inverted based on the value of said cumulative difference value includes, when said cumulative difference value is positive:
   determining that said page is not inverted.

6. The method of claim 4, wherein making a decision as to whether said page is inverted or not inverted based on the value of said cumulative difference value includes, when said cumulative difference value is negative:
   determining that said page is inverted.

7. The method of claim 4, further comprising:
   generating an estimate of the number of text characters that were processed in
   generating said cumulative difference value; and
   generating a confidence measure based on said estimate of the number of text characters that were processed.

8. The method of claim 1, wherein said first and second portions of said current line of text are of equal horizontal length.

9. The method of claim 1, further comprising:
   setting said current line of text to a new line of text;
   generating a per text line difference value for said current line of text; and
   updating the cumulative difference value based on the per text line difference value for the current line of text.

10. The method of claim 9, further comprising:
    inverting said page when said page is determined to be inverted; and
    storing, in memory, said inverted page in place of said page.

11. The method of claim 1 wherein prior to determining if said page is inverted or non-inverted, identifying said current line of text as a line of text based on said generated histogram.

12. The method of claim 11, wherein said step of identifying said current line of text as a line of text includes determining if a count of the number of foreground pixel values included in rows of said column between and including said first and second peaks exceeds both said first and second counts of pixel values.

13. An apparatus for processing a page in the form of an image, the apparatus comprising:
    a histogram generator module configured to generate a histogram of foreground pixel counts corresponding to a current line of text of said page being processed, said foreground pixel counts corresponding to different rows of pixels corresponding to said current line of text;
    a peak identification module configured to identify a first peak and a second peak in said histogram, said first peak corresponding to a row of pixels above said second peak;
    a page orientation determination module configured to determine if said page is inverted or non-inverted based on a difference between a first count of foreground pixels in a first portion of said current line of text and a second count of foreground pixels in a second portion of said current line of text, said first portion being located in said line of text above said first peak, said second portion being located in said line of text below said second peak.

14. The apparatus of claim 13, wherein said page orientation determination module includes:
    a per text line difference value generation module configured to generate a per text line difference value, said per text line difference value being said difference between the first count of foreground pixels in the first portion of said current line of text and the second count of foreground pixels in the second portion of said current line of text.

15. The apparatus of claim 14, wherein said page orientation determination module further includes:
    an orientation determination module configured to determine if said page is inverted or non-inverted based on updating a cumulative difference value based on said per text line difference value.

16. The apparatus of claim 15, wherein said page orientation determination module further includes:
    an additional line determination module configure to determine if additional lines of text of said page are to be processed; and
    wherein said orientation determination module is configured to determine if said page is inverted or non-inverted following a determination by said additional line determination module that no additional lines of text of said page are to be processed; and
    wherein said orientation determination module is configured to make a decision as to whether said page is inverted or not inverted based on the value of said cumulative difference value.

17. The apparatus of claim 13, further comprising:
    a text line identification module configured to determine if a portion of an image is a line of text based on said generated histogram.

18. A non-transitory computer readable medium comprising computer executable instructions for controlling a computer to process a page in the form of an image, said page including lines of text, the computer readable medium including:
    instructions for controlling said computer to generate a histogram of foreground pixel counts corresponding to a current line of text of said page being processed, said foreground pixel counts corresponding to different rows of pixels corresponding to said current line of text;
    instructions for controlling said computer to identify a first peak and a second peak in said histogram, said first peak corresponding to a row of pixels above said second peak; and
    instructions for controlling said computer to determine if said page is inverted or non-inverted based on a difference between a first count of foreground pixels in a first portion of said current line of text and a second count of foreground pixels in a second portion of said current line of text, said first portion being located in said line of text above said first peak, said second portion being located in said line of text below said second peak.

19. The computer readable medium of claim 18, wherein said instructions for controlling said computer to determine if said page is inverted or non-inverted includes:
    instructions for controlling said computer to generate a per text line difference value, said per text line difference value being said difference between the first count of foreground pixels in the first portion of said current line of text and the second count of foreground pixels in the second portion of said current line of text.

20. The computer readable medium of claim 19, wherein said computer executable instructions for controlling said computer to determine if said page is inverted or non-inverted include:

instructions for controlling said computer to update a cumulative difference value based on said per text line difference value.

\* \* \* \* \*